US009140848B2

(12) United States Patent
Masuda

(10) Patent No.: US 9,140,848 B2
(45) Date of Patent: Sep. 22, 2015

(54) ILLUMINATION DEVICE AND DISPLAY DEVICE

(75) Inventor: Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 14/110,764

(22) PCT Filed: Apr. 12, 2012

(86) PCT No.: PCT/JP2012/060006
§ 371 (c)(1),
(2), (4) Date: Oct. 9, 2013

(87) PCT Pub. No.: WO2012/144410
PCT Pub. Date: Oct. 26, 2012

(65) Prior Publication Data
US 2014/0029296 A1    Jan. 30, 2014

(30) Foreign Application Priority Data

Apr. 19, 2011    (JP) ................................. 2011-093432

(51) Int. Cl.
| | | |
|---|---|---|
| *G02B 6/36* | (2006.01) | |
| *F21V 8/00* | (2006.01) | |
| *G02F 1/1335* | (2006.01) | |
| *G02B 6/00* | (2006.01) | |

(52) U.S. Cl.
CPC ........ *G02B 6/0088* (2013.01); *G02F 1/133608* (2013.01); *G02F 1/133615* (2013.01)

(58) Field of Classification Search
CPC ....... F21V 15/00–15/008; F21V 17/00–17/20; F21V 21/00–21/406; G02B 6/0088; G02F 1/133615; G02F 1/133608

USPC .......................... 362/600, 616, 632–634, 606
See application file for complete search history.

(56) References Cited

U.S. PATENT DOCUMENTS

| | | | |
|---|---|---|---|
| 2005/0248694 A1 | 11/2005 | Nakayama | |
| 2005/0270796 A1* | 12/2005 | Ichikawa et al. | ............. 362/559 |
| 2009/0180299 A1 | 7/2009 | Ito et al. | |
| 2012/0086882 A1 | 4/2012 | Itoh | |
| 2012/0287670 A1* | 11/2012 | Ishizaka et al. | ............. 362/606 |

FOREIGN PATENT DOCUMENTS

| | | |
|---|---|---|
| JP | 2002-116440 A | 4/2002 |
| JP | 2004-021104 A | 1/2004 |
| JP | 2005-347214 A | 12/2005 |
| JP | 2009-170188 A | 7/2009 |
| JP | 2010-108866 A | 5/2010 |
| WO | 2011/004635 A1 | 1/2011 |

OTHER PUBLICATIONS

Official Communication issued in International Patent Application No. PCT/JP2012/060006, mailed on May 15, 2012.

* cited by examiner

*Primary Examiner* — Anh Mai
*Assistant Examiner* — Nathaniel Lee
(74) *Attorney, Agent, or Firm* — Keating & Bennett, LLP

(57) ABSTRACT

A backlight device (illumination device) 80 includes a plurality of LEDs 22 and entrance ends 30*a* that light from the LEDs 22 enters, and further includes a plurality of light guide bars 30 that guide the light from the LEDs 22 and a bar-shaped attachment member 55 to which the LEDs 22 and the light guide bars 30 are attached.

12 Claims, 17 Drawing Sheets

ILLUMINATION DEVICE AND DISPLAY DEVICE

TECHNICAL FIELD

The present invention relates to an illumination device and a display device.

BACKGROUND ART

Conventionally, as an illumination device that illuminates a display panel, a direct backlight device (for example, see patent document 1) and an edge light (side light) backlight device are known.

Patent document 1 described above discloses a liquid crystal display device including a direct backlight device using a lamp (fluorescent tube) as a light source. This liquid crystal display device includes a diecast frame that supports a backlight. The diecast frame is an integral structure formed with an outer frame part that has a rising part which protrudes to the side of a liquid crystal panel and a coupling part that couples the outer frame part. In the diecast frame, a hole formation space surrounded by the outer frame part and the coupling part is formed, and a space for holding the lamp is formed by the ringing part.

In the backlight device disclosed in patent document 1, the stiffness of the diecast frame is enhanced by the rising part, and the weight thereof is reduced by the provision of the hole formation space.

Here, since the fluorescent tube is generally formed with a glass tube, when the stiffness of the frame is low, the fluorescent tube is easily broken. Hence, it is necessary to use, as the frame, a highly stiff frame, such as a diecast frame, formed with an integral structure.

However, since the diecast frame is formed by melting and pouring metal into a die, even if the its weight is reduced by the provision of the hole formation space, the weight is heavy as compared with a chassis formed by processing a metal plate or the like. Hence, in patent document 1 where the diecast frame is provided, it is difficult to further reduce the weight of the backlight device.

On the other hand, in recent years, attention has been focused on a method of using a light emitting diode (LED) as a light source instead of a fluorescent tube. In a direct backlight device using LEDs as light sources, the light sources are arranged two-dimensionally (planarly) in a position directly below a display panel. In this case, it is difficult to reduce the number of light sources so that, while the increase in the thickness of the backlight device is reduced, the uniformity of illumination light is acquired. Hence, since the light sources are closely put within an illumination region, it is necessary to use, as a backlight chassis, a box-shaped chassis having a flat surface (flat bottom portion) for retaining the light sources substantially over the entire surface.

In an edge light backlight device, a light guide plate is arranged directly below a display panel, and light sources are arranged around the light guide plate. Hence, in the edge light backlight device, as compared with the direct backlight device, it is possible to reduce the number of light sources. In the edge light backlight device, the light guide plate described above is generally formed with one member having substantially the same area as the display panel.

RELATED ART DOCUMENT

Patent Document

Patent document 1: JP-A-2004-21104

DISCLOSURE OF THE INVENTION

Problems to be Solved by the Invention

However, in the edge light backlight device (illumination device), the light guide plate may be deformed by an expansion coefficient difference with a chassis or the expansion and contraction of the light guide plate caused by moisture absorption. Hence, in order to correct deformation when the light guide plate is deformed, it is necessary to use, as a backlight chassis, a box-shaped highly stiff chassis having a flat surface (flat bottom portion).

As described above, in the conventional backlight device, even in the direct and edge light types, it is necessary to use a box-shaped chassis having a flat surface (flat bottom portion). Hence, it is difficult to reduce the weight of the chassis. Thus, it is difficult to reduce the weight of the backlight device and also reduce its cost.

The present invention is made to solve the foregoing problem; an object of the present invention is to provide an illumination device and a display device that can reduce their weight while reducing the decrease in the uniformity of illumination light.

Another object of the present invention is to provide an illumination device and a display device that can reduce their cost.

Means for Solving the Problem

To achieve the above objects, according to the present invention, there is provided an illumination device including: a plurality of light sources; a plurality of light guide bars which include entrance ends that light from the light sources enters and which guide the light from the light sources; and a bar-shaped attachment member to which the light sources and the light guide bars are attached.

In this configuration, a plurality of light guide bars that guide the light from the light sources are provided, and thus it is not necessary to arrange, unlike the direct illumination device, the light sources in an illumination region (a region directly below the display panel). Hence, as compared with the direct illumination device, it is possible to reduce the number of light sources. Since the light from the light sources is extended in the light guide bars and is emitted upwardly, even when the number of light sources is reduced, it is possible to reduce the decrease in the uniformity of the illumination light. Furthermore, with the configuration described above, it is possible to reduce the thickness of the illumination device.

By using a plurality of light guide bars, instead of the box-shaped chassis having the flat surface (flat bottom portion) over the entire surface of the illumination region, it is possible to use the bar-shaped attachment member. Since the bar-shaped attachment member has a small amount of material as compared with the box-shaped chassis or the like, its weight is light. Hence, such a bar-shaped attachment member is used, and thus it is possible to reduce the weight of the illumination device. Furthermore, as the bar-shaped attachment member has a smaller amount of material, it is possible to reduce the cost of the material. Hence, such a bar-shaped attachment member is used, and thus it is possible to reduce the cost of the illumination device.

When the light guide bars are arranged a predetermined distance apart from each other, even if the light guide bars expand and contract by heat, moisture absorption and the like, the light guide bars are unlikely to be deformed. Hence, it is not necessary to use a flat surface for correcting deformation.

Furthermore, when the light guide bars are arranged a predetermined distance apart from each other in the illumination region, it is possible to reduce the area of the light guide bars as compared with, for example, the area of the display panel. Hence, as compared with, for example, a light guide plate of one sheet having about the same area as the display panel, it is possible to reduce the weight of the light guide bars. Hence, in this way, it is also possible to reduce the weight of the illumination device. It is also possible to reduce the cost of the illumination device.

Preferably, the illumination device configured as described above further includes a frame-shaped frame which is assembled with a plurality of members, in which the frame includes, as a part thereof, the bar-shaped attachment member. In this configuration, since it is possible to form the chassis holding the light guide bars and the like into the shape of a frame, it is possible to easily reduce the weight and the cost of the illumination device. The attachment member described above is used to configure the frame, and thus it is possible to stably attach the light guide bars and the light sources. Hence, it is possible to reduce the decrease in the uniformity and brightness of the illumination light caused such as by variations in the position of the light guide bars or the light sources.

Preferably, in the illumination device configured as described above, the frame includes an outer frame, a coupling part which couples the outer frame and a hole formation space surrounded by the outer frame and the coupling part. As described above, the coupling parts are connected (coupled) to the outer frame of the frame, and thus it is possible to enhance the strength of the frame, with the result that it is possible to increase the size of the illumination device. Moreover, with the hole formation spaces surrounded by the outer frame and the coupling parts, it is possible to reduce the weight and the cost of the frame. With the configuration described above, even when the size of the illumination device is increased, it is possible to reduce its weight. In this case, it is also possible to reduce the thickness of the illumination device.

Preferably, in the illumination device configured as described above, the hole formation space has an area equal to or more than half a region surrounded by the outer frame. With this configuration, it is possible to effectively reduce the weight and the cost of the frame.

The illumination device configured as described above may further include a clip which retains the light guide bar, in which the light guide bar may be fixed with the clip to the frame. In this configuration, since it is possible to more stably attach the light guide bars, for example, it is possible to reduce the movement and the curving of the light guide bars. Hence, it is possible to effectively reduce the decrease in the uniformity and brightness of the illumination light caused such as by variations in the position of the light guide bars or the like.

Preferably, in the illumination device configured as described above, the clip retains the light guide bar such that the light guide bar can be moved in the longitudinal direction of the light guide bar. In this configuration, when the light guide bars expand and contract by heat, moisture absorption and the like, it is possible to move (slide) the light guide bars with respect to the clips. Hence, even when the light guide bars are retained by the clips, it is possible to reduce the deformation of the light guide bars (for example, the occurrence of the bending of the light guide bars).

Preferably, in the illumination device configured as described above, a part of the light guide bars are coupled to each other with a coupling portion, the coupling portion includes a protrusion portion which extends parallel to the longitudinal direction of the light guide bar and the protrusion portion is retained by the clip. In this configuration, unlike the case where the light guide bars are directly retained by the clips, since the emission of light from the light guide bars is prevented from being inhibited by the clips, as compared with the case where the light guide bars are directly retained by the clips, it is possible to enhance the uniformity of the illumination light.

When the light guide bars are coupled by the coupling portion, part of light passing through the light guide bars is moved back and forth between adjacent light guide bars through the coupling portion. Then, when the light guide bars and the coupling portion are retained by the clips, part of light passing through the light guide bars and the coupling portion is emitted from parts where the light guide bars and the coupling portion are in contact with the clips and is absorbed by the clips. Here, since the amount of light passing through the coupling portion is small as compared with the amount of light passing through the light guide bars, the coupling portion is retained by the clips, and thus it is possible to reduce the amount of light absorbed by the clips as compared with the case where the light guide bars are directly retained by the clips. Thus, it is possible to reduce the loss of light. Since the light guide bars are coupled by the coupling portion, and thus it is possible to simultaneously make the positions of the light guide bars coincide with the positions of the light sources, it is possible to obtain the effect of enhancing the operation of assembling the illumination device.

Preferably, the illumination device configured as described above further includes a diffusion plate which is arranged above the light guide bars. In this case, the diffusion plate is preferably supported y a support pin which is fixed to a coupling part of the frame. In this configuration, since it is possible to appropriately maintain the distance between the diffusion plate and the light guide bars, it is possible to enhance the uniformity of the illumination light. Since the support pins are fixed to the coupling parts of the frame, even when the support pins described above are provided, it is not necessary to form the flat surface (flat bottom portion) over the entire surface of the illumination region. Hence, even when the support pins are provided, it is possible to reduce the weight and the cost of the illumination device.

Preferably, in the illumination device configured as described above, a reflective member which reflects light from the light guide bars upwardly is arranged below the light guide bars.

Preferably, in the illumination device configured as described above, the light guide bar is formed to be tapered. In this configuration, since it is possible to reduce the emission of light from the top end surface of the light guide bar, it is possible to enhance the efficiency of utilization of light. When a large amount of light is emitted from the top end surface of the light guide bar, in the display panel, the brightness of part of the light guide bar in the vicinity of the top end surface is increased. Hence, as described above, the emission of light from the top end surface of the light guide bar is reduced, and thus it is possible to more enhance the uniformity of the brightness of the display panel.

Preferably, the illumination device configured as described above further includes a retaining member which retains a part of the light guide bar on a side of the entrance end, in which the light guide bar is attached to the attachment member through the retaining member. In this configuration, it is possible to easily attaché a plurality of light guide bars to the attachment portion.

Preferably, in the illumination device configured as described above, a convex portion is provided on the light guide bar, and in the retaining member, a concave portion is provided which is fitted to the convex portion of the light guide bar. In this configuration, since it is possible to locate the light guide bar in a predetermined position of the retaining member, it is possible to appropriately maintain the distance between the light guide bars and the light sources. In this way, it is possible to reduce the decrease in the efficiency of the entrance of light into the light guide bar.

Preferably, in the illumination device configured as described above, the light guide bar is formed of a transparent resin. In this configuration, it is possible to reduce the weight of the light guide bar. It is also possible to reduce the breakage of the light guide bar.

A display device according to the present invention includes: an illumination device of each of the configurations described above; and a display panel which is illuminated by the illumination device. In this configuration, it is possible to obtain the display device that can reduce its weight and cost while acquiring the uniformity of the illumination light.

Advantages of the Invention

As described above, according to the present invention, it is possible to easily obtain the illumination device and the display device that can reduce the weight thereof while reducing the decrease in the uniformity of the illumination light.

According to the present invention, it is also possible to easily obtain the illumination device and the display device that can reduce the cost thereof.

DESCRIPTION OF EMBODIMENTS

Embodiments of the present invention will be described in detail below with reference to accompanying drawings.

(First Embodiment)

Figure 1:
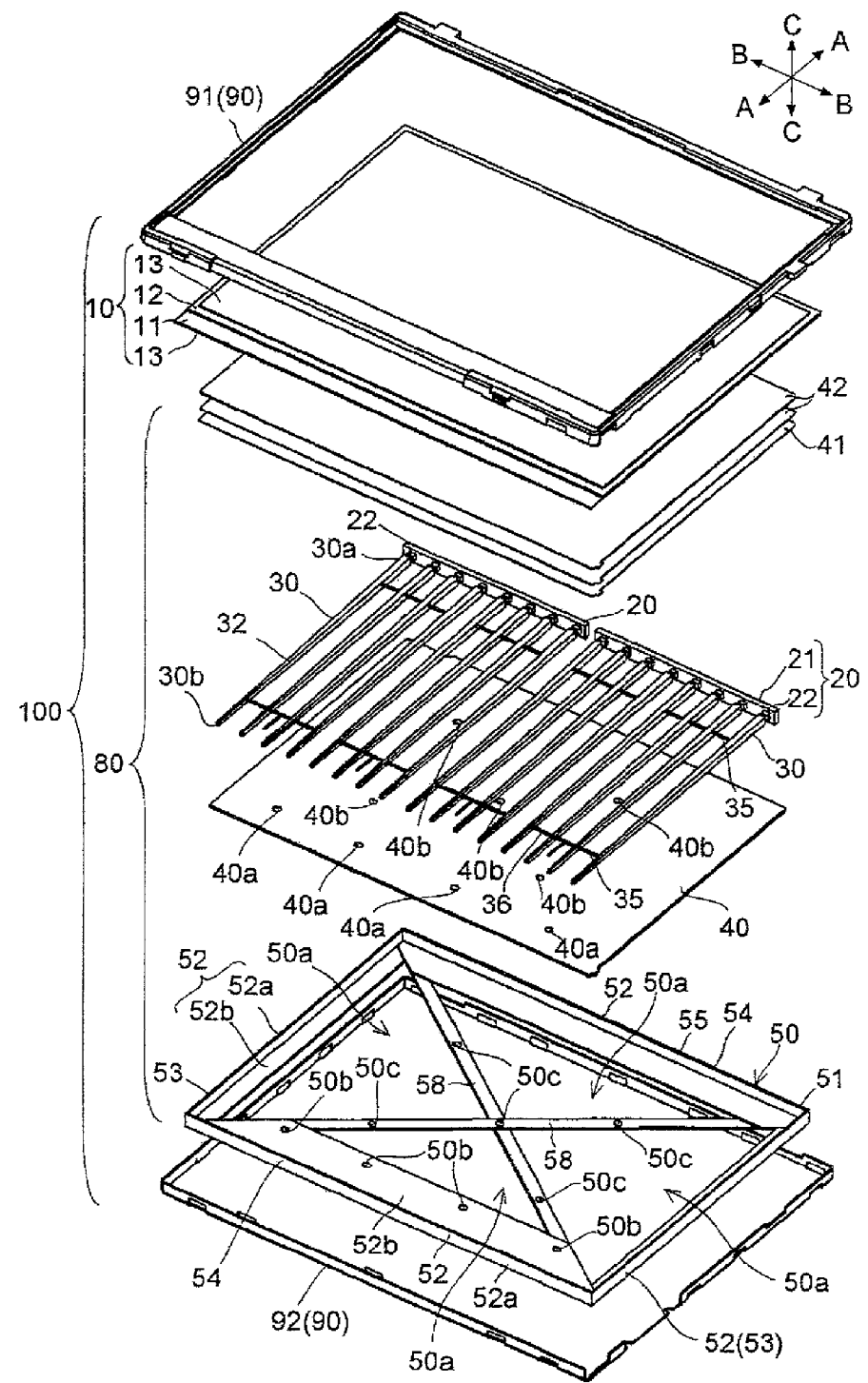
[FIG. 1] An exploded perspective view of a liquid crystal display device according to a first embodiment of the present invention.
Figure 2:
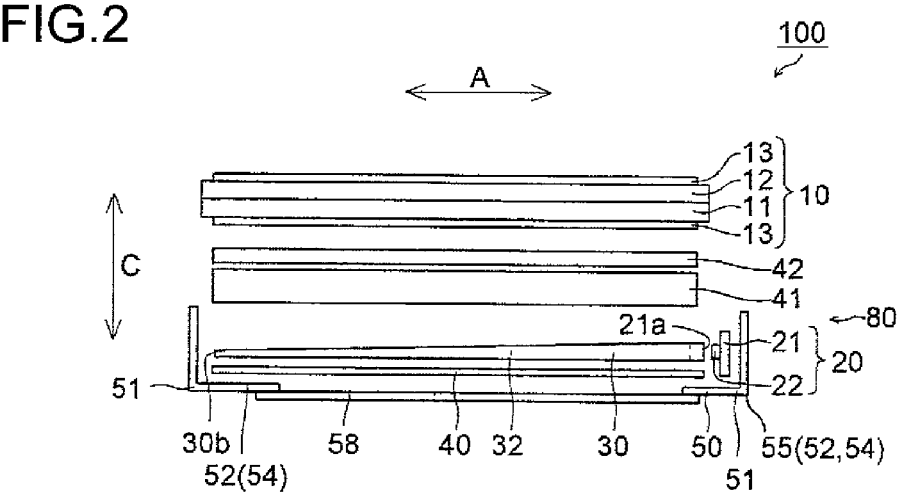
[FIG. 2] A cross-sectional view schematically showing the liquid crystal display device according to the first embodiment of the present invention.
Figure 3:
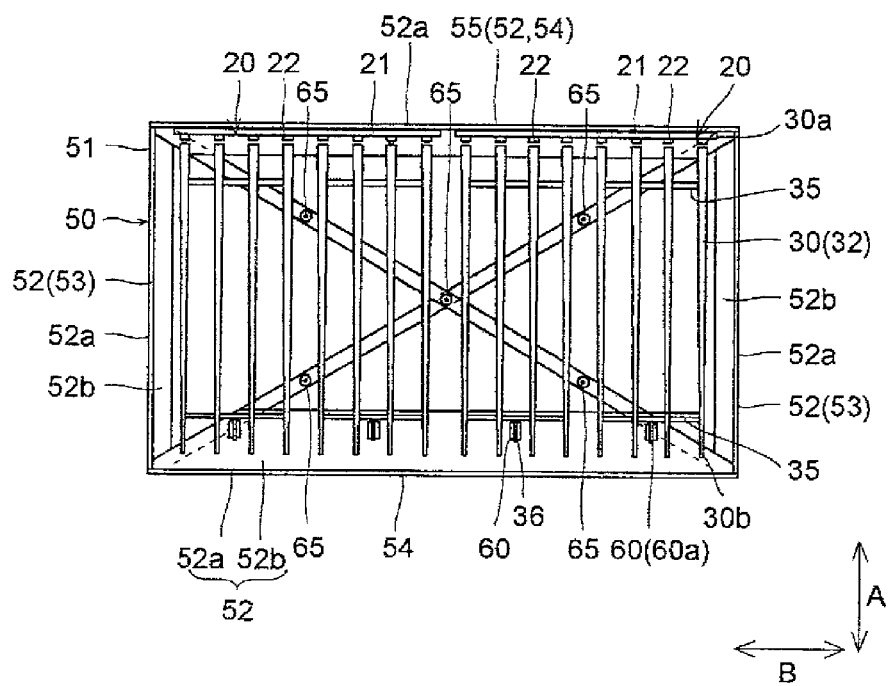
[FIG. 3] A plan view showing the internal structure of a backlight device according to the first embodiment of the present invention.

FIG. 1 is an exploded perspective view of a liquid crystal display device according to a first embodiment of the present invention. FIG. 2 is a cross-sectional view schematically showing the liquid crystal display device according to the first embodiment of the present invention. FIG. 3 is a plan view showing the internal structure of a backlight device according to the first embodiment of the present invention. FIGS. 4 to 10 are diagrams for illustrating the backlight device according to the first embodiment of the present invention. With reference to FIGS. 1 to 10, the backlight device and the liquid crystal display device including the backlight device will first be described. For ease of understanding, a reflective sheet is omitted in FIG. 3.

The liquid crystal display device 100 of the first embodiment includes, as shown in FIG. 1, a liquid crystal display panel 10, the backlight device 80 that supplies light to the liquid crystal display panel 10 and a pair of housings 90 (a front housing 91 and a back housing 92) that sandwich these components and are opposite each other. The liquid crystal display device 100 is an example of a "display device" of the present invention; the liquid crystal display panel 10 is an example of a "display panel" of the present invention. The backlight device 80 is an example of an "illumination device" of the present invention.

The liquid crystal display panel 10 is formed by, for example, adhering, with a seal member (not shown), an active matrix substrate 11 including switching elements such as TFTs (thin film transistor) and an opposite substrate 12 that is opposite the active matrix substrate 11. Liquid crystal (not shown) is sealed in a gap between both the substrates 11 and 12. A polarization film 13 is attached to each of the light reception surface side of the active matrix substrate 11 and the light emission surface side of the opposite substrate 12.

The liquid crystal display panel 10 configured as described above utilizes the change in transmittance caused by the inclination of liquid crystal molecules to display an image.

As shown in FIGS. 1 and 2, the backlight device 80 of the first embodiment is an edge light (side light) backlight device, and includes LED (light emitting diode) modules 20, a plurality of light guide bars 30 that guide light from the LED modules 20, the reflective sheet (reflective member) 40, a diffusion plate 41 and an optical sheet 42.

Furthermore, the backlight device 80 of the first embodiment includes, instead of a backlight chassis, a frame 50 to which the LED modules 20 and the light guide bars 30 are attached. The backlight device 80 is arranged directly below the liquid crystal display panel 10.

The LED module 20 of the backlight device 80 is a module that emits light, and includes a mounting substrate 21 and LEDs 22 that are mounted as a light source on the substrate surface of the mounting substrate 21.

The mounting substrate 21 is a plate-shaped rectangular substrate; on the substrate surface, a plurality of electrodes (not shown) are aligned. The LEDs 22 are attached onto the electrodes. In the backlight device 80 of the first embodiment, for example, two mounting substrates 21 are included, and are arranged on one side in a widthwise direction (A direction) of the backlight device 80 (see FIG. 1).

The LED 22 is mounted on the electrode (not shown) formed on the substrate surface of the mounting substrate 21 and thereby receives the supply of current to emit light. The LED 22 is formed with, for example, a white LED that emits white light. In order to obtain the sufficient amount of light, a plurality of LEDs (light emitting elements, point light sources) 22 are preferably mounted on the mounting substrate 21.

As shown in FIGS. 1 and 3, the LEDs 22 (the LED modules 20) are arranged in a row on the one side in the widthwise direction (A direction) of the backlight device 80. In other words, the LEDs 22 (the LED modules 20) are arranged on one side (long side) of the backlight device 80. Hence, the LEDs 22 (light sources) are not arranged in an illumination region (a region corresponding to the display region of the liquid crystal display panel 10), and are arranged in the vicinity of an edge that is the non-display region of the liquid crystal display panel 10 (see FIG. 1).

Figure 4:
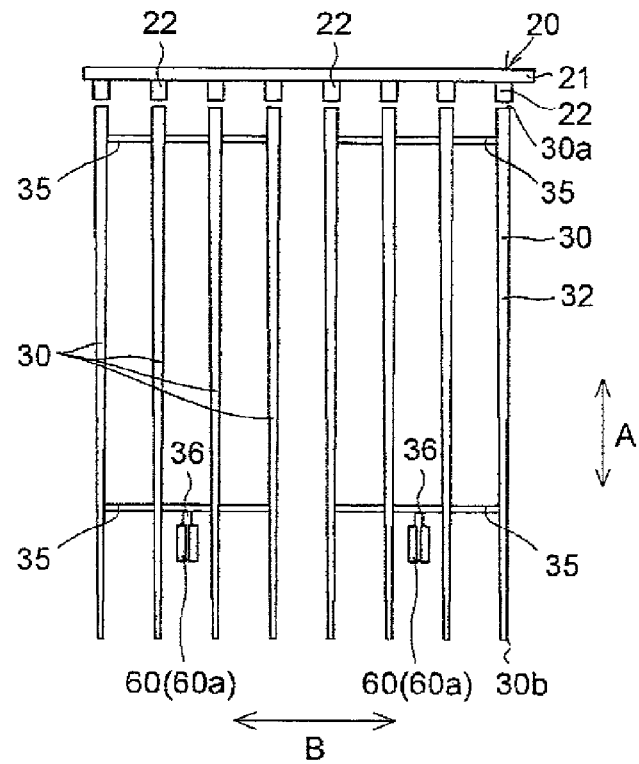
[FIG. 4] A plan view showing the light guide bars of the backlight device according to the first embodiment of the present invention.

The light guide bar 30 is a bar-shaped member that is formed of a material which is a transparent resin such as acrylic or polycarbonate, and receives light from the LED 22 to guide the light therewithin (to guide the light). As shown in FIG. 4, in the light guide bar 30, an end in the longitudinal direction (the direction of the entire length) is an entrance end (an entrance surface) 30a which the light from the LED 22 enters, and the other end in the longitudinal direction (the direction of the entire length), that is, the end on the side opposite to the entrance end 30a is a top end (a top end surface) 30b.

Figure 5:
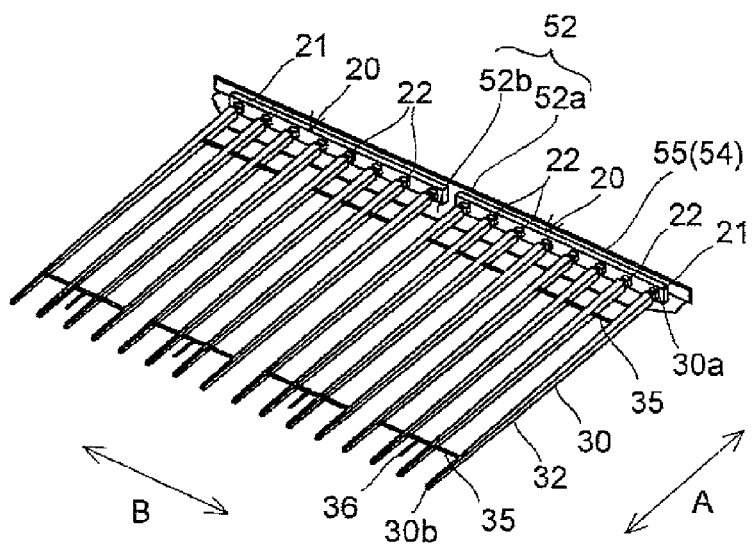
[FIG. 5] A perspective view showing the light guide bars of the backlight device according to the first embodiment of the present invention.

The light guide bar 30 includes a light emission portion 32 that emits, to the outside, the light from the LED 22 which has enters the light guide bar 30 through the entrance end 30a. The light emission portion 32 (the light guide bar 30) is formed such that, as shown in FIGS. 4 and 5, the light emission portion 32 is formed into a tapered shape (tapered shape) in which the light emission portion 32 becomes thinner as it extends to the top end 30b (its cross-sectional area is decreased). As described above, the light emission portion 32 (the light guide bar 30) is formed into a tapered shape (tapered shape), and thus it is possible to easily emit the light from the light emission portion 32 of the light guide bar 30. The cross section of the light guide bar 30 is formed substantially in the shape of a rectangle.

The light guide bars 30 have substantially the same shape, and are arranged, as shown in FIGS. 1 to 3, a predetermined distance apart in the illumination region of the backlight device 80. Specifically, the light guide bars 30 are arranged so as to extend in the widthwise direction (the A direction) of the backlight device 80 with its entrance end 30a on the side of the light source (the side of the LED 22). The light guide bars 30 are also aligned to be separated from each other (a predetermined distance apart) in the longitudinal direction (B direction) of the backlight device 80.

For the entrance end 30a of the light guide bar 30, one or more light sources (the LEDs 22) are arranged, and the light emitted from the light sources enters the entrance end 30a of the light guide bar 30. Then, the light that has entered the light guide bar 30 through the entrance end 30a is guided through the light guide bar 30, and is emitted through the light emission portion 32 of the light guide bar 30.

As shown in FIG. 4, in the first embodiment, part of the light guide bars 30 are coupled to each other by coupling portions 35. Specifically, adjacent light guide bars 30 are coupled by the coupling portion 35, and thus a plurality of (for example, four) light guide bars 30 are formed integrally (into a unit).

The coupling portion 35 is formed so as to extend in the direction (the B direction) perpendicular to (intersecting) the direction in which the light guide bars 30 extend. In the first embodiment, the coupling portions 35 are formed at two places on the side of the entrance end 30a of and the side of the top end 30b of the light guide bars 30.

Although the coupling portion 35 may be formed to have the same cross-sectional area as the light guide bar 30, the coupling portion 35 is preferably formed to have a cross-sectional area smaller than the light guide bar 30. The coupling portion 35 is formed of the same transparent resin as the light guide bar 30, and is formed, for example, integrally by mold injection with a mold. However, the coupling portion 35 may be formed of a material different from the light guide bar 30.

Although in the first embodiment, four light guide bars 30 are coupled by the coupling portion 35, two, three or five or more light guide bars 30 may be coupled by the coupling portion 35. All the light guide bars 30 included in the backlight device 80 may be coupled by the coupling portions 35. On the coupling portion 35 provided on the side of the top end 30b of the light guide bar 30, a protrusion portion 36 is formed that extends parallel to the direction (the longitudinal direction) in which the light guide bars 30 extend.

Here, in the first embodiment, as shown in FIGS. 3 and 5, the LED modules 20 and the light guide bars 30 are attached to a bar-shaped attachment member 55 that is part of the frame 50 described above.

Figure 6:
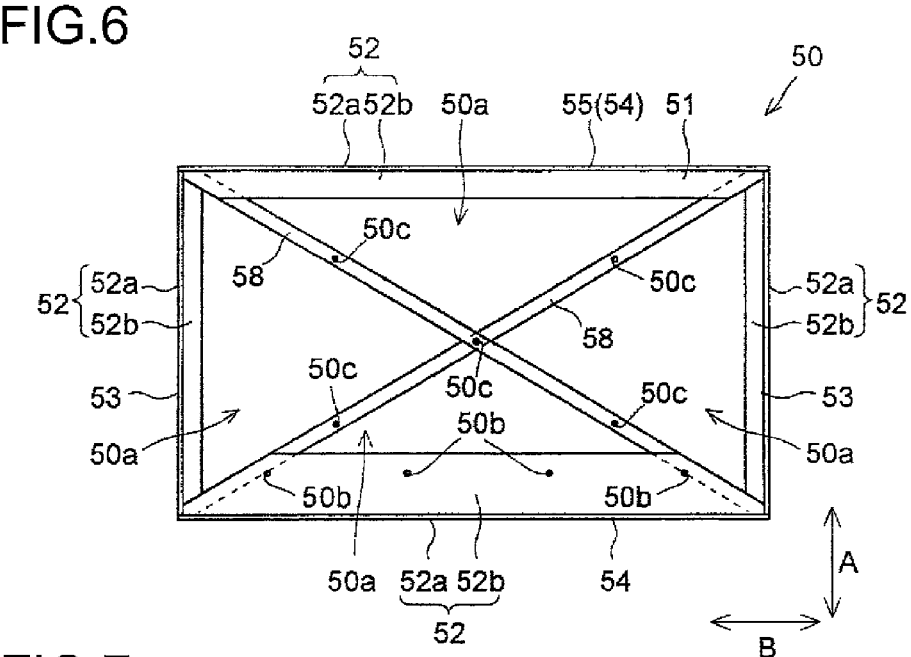
[FIG. 6] A plan view of the frame of the backlight device according to the first embodiment of the present invention.
Figure 7:
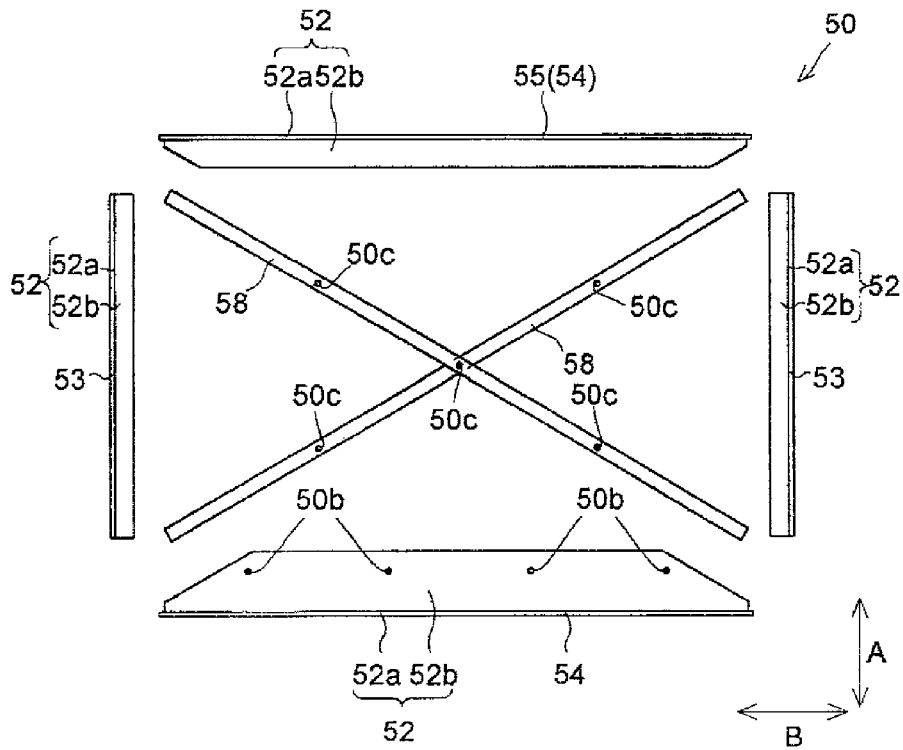
[FIG. 7] A plan view showing the state where the frame of FIG. 6 is disassembled.

Specifically, as shown in FIGS. 6 and 7, the frame 50 includes an outer frame 51 that is formed substantially in the shape of a rectangle, and a coupling part 58 that is coupled to the outer frame 51. The coupling part 58 is connected (coupled) to the outer frame 51, and thus a middle frame is formed.

The outer frame 51 of the frame 50 is formed by coupling four bar-shaped members 52 into a frame shape. Each of the bar-shaped members 52 is formed by bending a metal plate into the shape of a letter L, and includes a wall portion 52a and a bottom portion 52b. The four bar-shaped members 52 include a pair of short side members 53 (52) that form the short sides of the frame 50, and a pair of long side members 54 (52) that form the long sides of the frame 50. One of the pair of long side members 54 is the attachment member 55 described above.

The coupling part 58 of the frame 50 is formed with a long and thin metal plate. In the first embodiment, the frame 50 includes two coupling parts 58. The two coupling parts 58 are connected to the outer frame 51 of the frame 50 so as to be formed in the shape of a cross (x shape). Specifically, along the diagonal lines (diagonal lines connecting the corner portions opposite each other) connecting the corner portions of the outer frame 51, the two coupling parts 58 are connected to the outer frame 51. Thus, in a region corresponding to the bottom surface of the backlight chassis in the frame 50, hole formation spaces 50a surrounded by the outer frame 51 and the coupling parts 58 are formed. The hole formation space 50a preferably has an area equal to or more than half the region surrounded by the outer frame 51.

In the outer frame 51 (the bottom portion 52b of the long side member 54 (52) opposite the attachment member 55) of the frame 50, a plurality of through holes 50b are formed. In the coupling parts 58 coupled to the outer frame 51, a plurality of through holes 50c are formed.

The individual members of the frame 50 are coupled (fixed) by, for example, welding so as to be assemble into the frame-shaped frame 50. However, the assembly of the frame 50 can be performed by coupling (fixing) the individual members with another method such as screwing or riveting other than welding.

The bar-shaped members 52 of the outer frame 51 of the frame 50 are formed by, for example, processing a metal plate such as an aluminum alloy, iron or stainless steel. As with the outer frame 51, the coupling parts 58 of the frame 50 are formed with a metal plate such as an aluminum alloy, iron or stainless steel. The thickness of the metal plate can be set at, for example, about 0.8 mm to 1.5 mm (for example, 1.0 mm) though it differs depending on its mechanical strength.

Since as shown in FIGS. 1 and 3, in the bar-shaped members 52 (the short side members 53 and the long side members 54) of the outer frame 51 of the frame 50, the wall portions 52a are provided, in the region (the region within the frame 50) surrounded by the wall portions 52a, the space is formed that holds the reflective sheet 40, the LED modules 20 and the light guide bars 30. In the space, the reflective sheet 40, the LED modules 20, the light guide bars 30 and the like are held.

The reflective sheet 40 is an optical sheet that is arranged below the light guide bars 30, and reflects, to the side of the liquid crystal display panel 10, light travelling toward the side opposite to the liquid crystal display panel 10, of the light emitted from the light guide bars 30. As shown in FIGS. 1 and 2, the reflective sheet 40 is arranged on the coupling parts 58 of the frame 50, and through holes 40a and 40b (see FIG. 1) are respectively formed in the positions corresponding to the through holes 50b and 50c of the frame 50.

Figure 8:
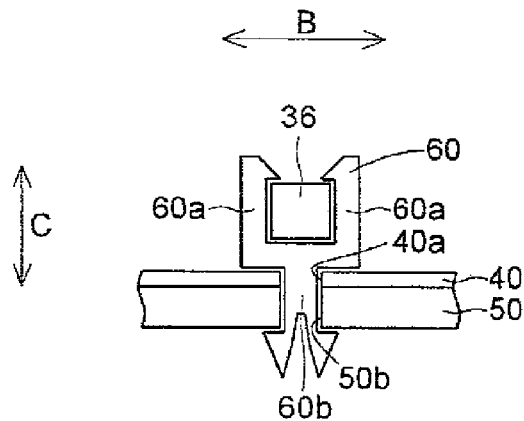
[FIG. 8] An enlarged cross-sectional view showing the structure of the light guide bar (coupling portion) and a clip of the backlight device according to the first embodiment of the present invention.

As shown in FIGS. 3 and 4, in the region within the frame 50, the light guide bars 30 are retained with clips 60. In the first embodiment, the protrusion portion 36 of the coupling portion 35 coupling the light guide bars 30 is sandwiched (retained) by the clips 60. As shown in FIG. 8, the clip 60 includes a pair of sandwiching portions 60a that sandwich (retain) the protrusion portion 36 of the coupling portion 35 and an insertion portion 60b that is inserted into the through hole 40a of the reflective sheet 40 and the through hole 50b of the frame 50. The insertion portion 60b of the clip 60 is inserted into the through holes 40a and 50b, and thus the clip 60 is attached to the frame 50.

As shown in FIG. 4, the sandwiching portions 60a of the clip 60 retain the light guide bars 30 such that the sandwiching portions 60a can move the light guide bars 30 in the longitudinal direction (the A direction) of the light guide bars 30. In other words, the clip 60 can move the light guide bars 30 in the longitudinal direction of the light guide bars 30, and fixes the light guide bars 30 in the direction intersecting (perpendicular to) the longitudinal direction. Since the light guide bars 30 expand and contract mainly in the longitudinal direction by heat, moisture absorption and the like, the light guide bars 30 are made to be movable in the longitudinal direction, with the result that, when the light guide bars 30 expand and contract, the light guide bars 30 move (slide) with respect to the clip 60.

As shown in FIGS. 1 and 2, the diffusion plate 41 is an optical sheet that covers the light guide bars 30, and diffuses the light emitted from the light guide bars 30. In other words, the diffusion plate 41 diffuses the light from the light guide bars 30, and spreads the light over the entire region of the liquid crystal display panel 10.

The optical sheet 42 is formed with a plurality of types of sheets such as a prism sheet and a lens sheet, and collects the light from the diffusion plate 41 into a predetermined viewing angle.

Figure 9:
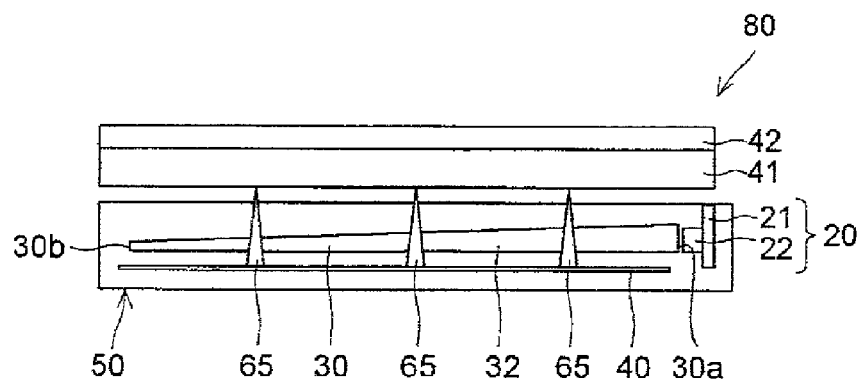
[FIG. 9] A cross-sectional view schematically showing the backlight device according to the first embodiment of the present invention.
Figure 10:
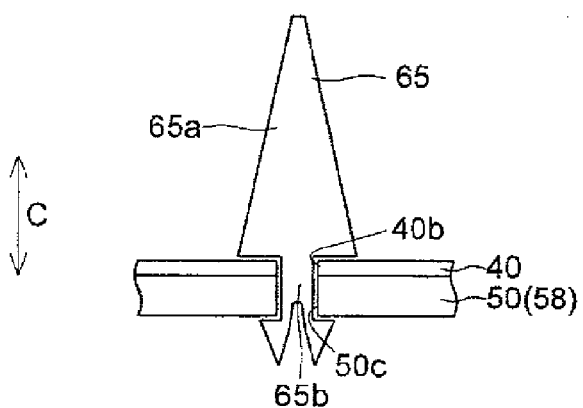
[FIG. 10] An enlarged cross-sectional view showing the structure of to support pin of the backlight device according to the first embodiment of the present invention.

As shown in FIG. 9, the backlight device 80 of the first embodiment includes support pins 65 that support the diffusion plate 41. The support pin 65 includes, as shown in FIG. 10, a support portion 65a that supports the diffusion plate 41 and an insertion portion 65b that is inserted into the through hole 40b of the reflective sheet 40 and the through hole 50c of the frame 50. The insertion portion 65b of the support pin 65 is inserted into the through holes 40b and 50c, and thus the support pin 65 is attached to the coupling part 58 (the middle frame).

The diffusion plate 41 and the optical sheet 42 are arranged on the outer frame 51 (see FIG. 3) of the frame 50 and the support pins 65, and thus the light guide bars 30 and the diffusion plate 41 are supported such that the distance between the light guide bars 30 and the diffusion plate 41 is a predetermined distance.

The clip 60 and the support pin 65 are formed of, for example, a white resin (white polycarbonate resin) or the like.

The backlight device 80 configured as described above and according to the first embodiment converts the light from the LED modules 20 (the LEDs 22), with the light guide bars 30, into planar light, passes the planar light through the diffusion plate 41 and the optical sheet 42 and supplies it to the liquid crystal display panel 10. Thus, the non-light-emission type liquid crystal display panel 10 receives the light (backlight) from the backlight device 80 to enhance a display function.

In the first embodiment, as described above, a plurality of light guide bars 30 that guide the light from the LEDs 22 are provided, and thus it is not necessary to arrange the LEDs 22 in the illumination region (the region directly below the liquid crystal display panel 10), unlike the direct backlight device. Hence, as compared with the direct backlight device, it is possible to reduce the number of LEDs 22. Since the light from the LEDs 22 is extended in the light guide bars 30 and is emitted upwardly, even when the number of LEDs 22 is reduced, it is possible to reduce the decrease in the uniformity of the illumination light. Furthermore, with the configuration described above, it is possible to reduce the thickness of the backlight device 80.

By using a plurality of light guide bars 30, instead of the box-shaped backlight chassis having the flat surface (flat bottom portion) over the entire surface of the illumination region, it is possible to use the frame-shaped frame 50 having the bar-shaped attachment member 55. In other words, in the first embodiment, it is possible to form the backlight into the shape of a frame. Since the frame-shaped frame 50 has a small amount of material as compared with the box-shaped backlight chassis or the like, its weight is light. Hence, such a frame 50 is used, and thus it is possible to reduce the weight of the backlight device 80. Furthermore, as the frame 50 has a smaller amount of material, it is possible to reduce the cost of the material. Hence, such a frame 50 is used, and thus it is possible to reduce the cost of the backlight device 80.

When the light guide bars 30 are arranged a predetermined distance apart in the illumination region, it is possible to reduce the area of the light guide bars 30 as compared with, for example, the area of the liquid crystal display panel 10. Hence, as compared with, for example, a light guide plate of one sheet having about the same area as the liquid crystal display panel 10, it is possible to reduce the weight of the light guide bars 30. Hence, in this way, it is also possible to reduce the weight of the backlight device 80. It is also possible to reduce the cost of the backlight device 80.

Furthermore, in the first embodiment, the frame 50 is formed with the bar-shaped attachment member 55, and thus it is possible to stably attach the light guide bars 30 and the LED modules 20. Hence, it is possible to reduce the decrease in the uniformity and brightness of the illumination light caused by variations in the position of the light guide bars 30 or the LED modules 20 (the LEDs 22).

Moreover, in the first embodiment, the coupling parts 58 are connected (coupled) to the outer frame 51 of the frame 50, and thus it is possible to enhance the strength of the frame 50, with the result that it is possible to increase the size of the backlight device 80. Moreover, with the hole formation spaces 50a surrounded by the outer frame 51 and the coupling parts 58, it is possible to reduce the weight and the cost of the frame 50. With the configuration described above, even when the size of the backlight device is increased, it is possible to reduce its weight. In this case, it is also possible to reduce the thickness of the backlight device 80.

If the hole formation spaces 50a are formed to have an area equal to or more than half the region surrounded by the outer frame 51, it is possible to effectively reduce the weight and the cost of the frame 50.

In the first embodiment, the clips 60 retaining the light guide bars 30 are provided, the light guide bars 30 are fixed to the frame 50 by the clips 60 and thus it is possible to more stably attach the light guide bars 30 to the frame 50. Hence, for example, since it is possible to reduce the movement and the curving of the light guide bars 30, it is possible to effectively reduce the decrease in the uniformity and brightness of the illumination light caused such as by variations in the position of the light guide bars 30 or the like.

Since the clips 60 retain the light guide bars 30 such that the light guide bars 30 can be moved in the longitudinal direction of the light guide bars 30, when the light guide bars 30 expand and contract by heat, moisture absorption and the like, it is possible to move (slide) the light guide bars 30 with respect to the clips 60. Hence, even when the light guide bars 30 are retained by the clips 60, it is possible to reduce the deformation of the light guide bars 30 (for example, the occurrence of the bending of the light guide bars).

In the first embodiment, the clip 60 sandwiches the protrusion portion 36 provided on the coupling portion 35 coupling the light guide bars 30, and thus the emission of light from the light guide bars 30 is prevented from being inhibited by the clips 60 unlike the case where the light guide bars 30 are directly sandwiched (retained) by the clips 60. Hence, as compared with the case where the light guide bars 30 are directly retained by the clips 60, it is possible to enhance the uniformity of the illumination light. Since the protrusion portion 36 is formed so as to extend parallel to the longitudinal direction of the light guide bars 30, as described above, when the light guide bars 30 expand and contract by heat, moisture absorption and the like, it is possible to move (slide) the light guide bars 30 with respect to the clips 60. Hence, it is possible to prevent the expansion and contraction of the light guide bars 30 by heat, moisture absorption and the like from being inhibited. In this way, it is possible to reduce the effect of the stress on the frame 50, with the result that it is possible to reduce the deformation of the light guide bars 30.

When the light guide bars 30 are coupled by the coupling portion 35, part of light passing through the light guide bars 30 is moved back and forth between adjacent light guide bars 30 through the coupling portion 35. Then, when the light guide bars 30 and the coupling portion 35 are retained by the clips 60, part of light passing through the light guide bars 30 and the coupling portion 35 is emitted from parts where the light guide bars 30 and the coupling portion 35 are in contact with the clips 60 and is absorbed by the clips 60. Here, since the amount of light passing through the coupling portion 35 is small as compared with the amount of light passing through the light guide bars 30, the coupling portion 35 is retained by the clips 60, and thus it is possible to reduce the amount of light absorbed by the clips 60 as compared with the case where the light guide bars 30 are directly retained by the clips 60. Thus, it is possible to reduce the loss of light. Since the light guide bars 30 are coupled by the coupling portion 35, and thus it is possible to simultaneously make the positions of the light guide bars 30 coincide with the positions of the LEDs 22, it is possible to obtain the effect of enhancing the operation of assembling the backlight device 80.

In the first embodiment, the diffusion plate 41 is supported by the support pins 65 fixed to the coupling parts 58 of the frame 50, and thus it is possible to reduce the bending of the diffusion plate 41 and thereby appropriately maintain the distance between the diffusion plate 41 and the light guide bars 30, with the result that it is possible to enhance the uniformity of the illumination light. Since the support pins 65 are fixed to the coupling parts 58 of the frame 50, even when the support pins 65 described above are provided, it is not necessary to form the flat surface (flat bottom portion) over the entire surface of the illumination region. Hence, even when the support pins 65 are provided, it is possible to reduce the weight and the cost of the backlight device.

As described above, in the backlight device 80 of the first embodiment, since in addition to the LED modules 20, the clips 60 retaining the light guide bars 30 and the support pins 65 supporting the diffusion plate 41 are only attached, it is not necessary to use the chassis having the flat surface (flat bottom portion) over the entire surface of the illumination region. Hence, as described above, it is possible to form the backlight chassis into the shape of a frame. Hence, it is possible to reduce the weight and the cost of the backlight device 80.

Moreover, in the first embodiment, the light guide bar 30 is formed to be tapered, and thus it is possible to easily emit light from the light emission portion 32 of the light guide bar 30. Since it is also possible to reduce the emission of light from the top end surface 30b (the top end 30b) of the light guide bar 30, it is possible to enhance the efficiency of utilization of light. When a large amount of light is emitted from the top end surface 30b of the light guide bar 30, in the liquid crystal display panel 10, the brightness of part of the light guide bar 30 in the vicinity of the top end surface 30b is increased. Hence, as described above, the emission of light from the top end surface 30b of the light guide bar 30 is reduced, and thus it is possible to more enhance the uniformity of the brightness of the liquid crystal display panel 10.

In the first embodiment, since the light guide bar 30 is formed of a transparent resin, as compared with the case where the light guide bar 30 is formed of glass, it is possible to reduce the weight of the light guide bar 30. It is also possible to reduce the breakage of the light guide bar 30. For example, even when the frame 50 is deformed by the heat generation of the LED modules 20 (the LEDs 22) or the like, it is possible to reduce the breakage of the light guide bar 30. Since the light guide bars 30 are separated from each other, the expansion and contraction of the light guide bars 30 by heat and moisture absorption do not exert the stress on the frame 50, and thus the frame 50 is not deformed.

(Second Embodiment)

Figure 11:
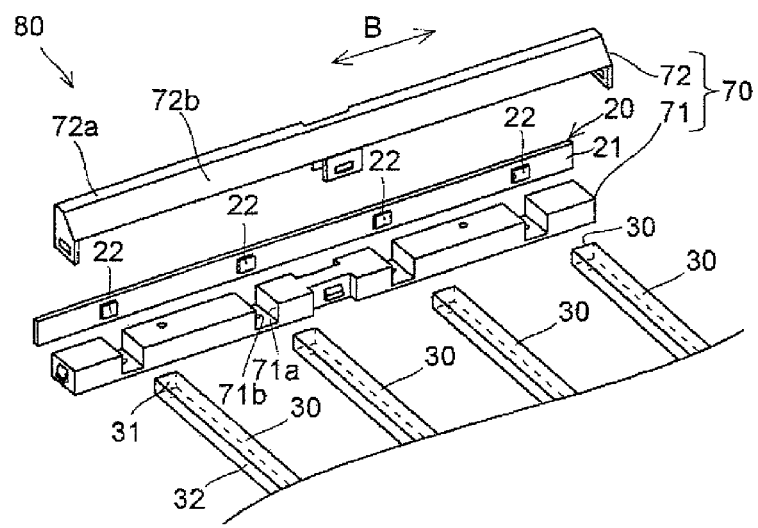
[FIG. 11] A perspective view of a retaining member used in a backlight device according to a second embodiment of the present invention.
Figure 12:
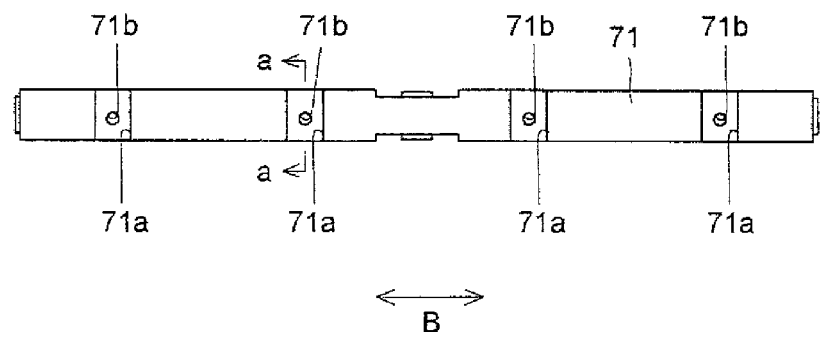
[FIG. 12] A plan view showing part (lower reflector member) of the retaining member of the backlight device according to the second embodiment of the present invention.
Figure 13:
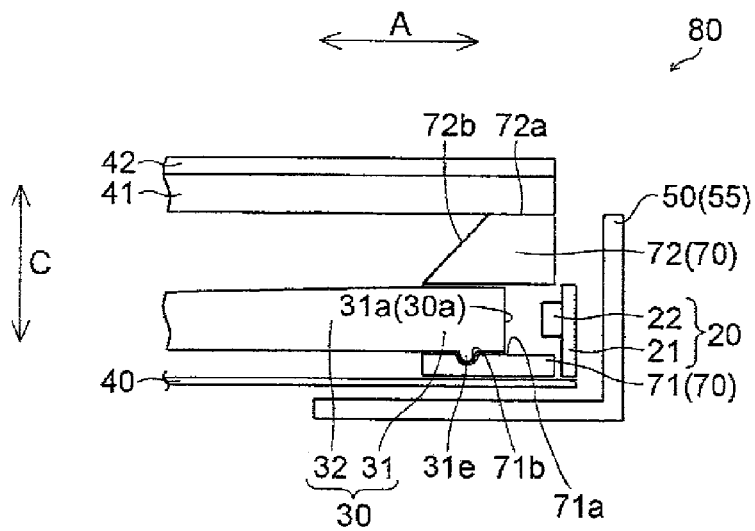
[FIG. 13] A cross-sectional view schematically showing part of the backlight device according to the second embodiment of the present invention.

FIG. 11 is a perspective view of a retaining member used in a backlight device according to a second embodiment of the present invention. FIG. 12 is a plan view showing a part (lower reflector member) of the retaining member of the backlight device according to the second embodiment of the present invention. FIG. 13 is a cross-sectional view schematically showing part of the backlight device according to the second embodiment of the present invention. FIGS. 14 to 21 are diagrams for illustrating the backlight device according to the second embodiment of the present invention. With reference to FIGS. 11 to 21, the backlight device according to the second embodiment of the present invention will be described. In the individual drawings, the corresponding constituent elements are identified with the same symbols, and thus their description will not be repeated as necessary.

As shown in FIG. 11, the backlight device 80 of the second embodiment further includes, in the configuration of the first embodiment, a retaining member 70 that retains the light guide bars 30.

The retaining member 70 includes the lower reflector member 71 and an upper reflector member 72 that covers the lower reflector member 71. The lower reflector member 71 and the upper reflector member 72 are formed of, for example, a white polycarbonate resin or the like, and have the function of reflecting light.

The lower reflector member 71 is formed substantially in the shape of a rectangular parallelepiped extending in the longitudinal direction (the B direction) of the backlight device 80. As shown in FIGS. 11 and 12, in the lower reflector member 71, a plurality of concave portions 71a for retaining the end portions of the light guide bars 30 are formed. The concave portions 71a are provided in the B direction with a predetermined pitch.

Figure 14:
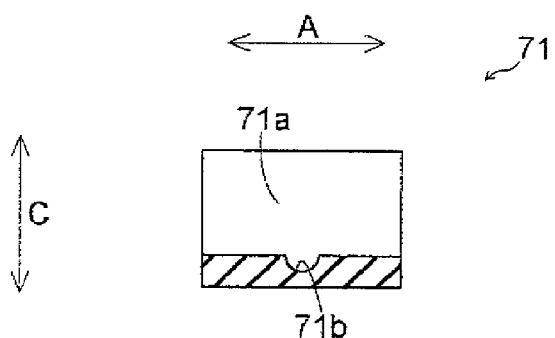
[FIG. 14] An enlarged cross-sectional view (the view corresponding to a cross section taken along line a-a of FIG. 12) showing the structure of the lower reflector member of the retaining member shown in FIG. 12.

As shown in FIGS. 13 and 14, in the concave portion 71a, for example, a hemispherical engagement concave portion 71b is formed. The engagement concave portion 71b engages with a convex portion 31e (see FIGS. 13 and 17) of the light guide bar 30, which will be described later. The engagement concave portion 71b is used to locate the light guide bar 30 when the backlight device 80 is assembled. The engagement concave portion 71b also has the function of reducing the movement of the light guide bar 30 in the A direction.

As shown in FIG. 13, the LED module 20 (the mounting substrate 21) is attached to the lower reflector member 71, and each of the LEDs 22 of the LED module 20 is located in the concave portion 71a of the lower reflector member 71.

Figure 15:
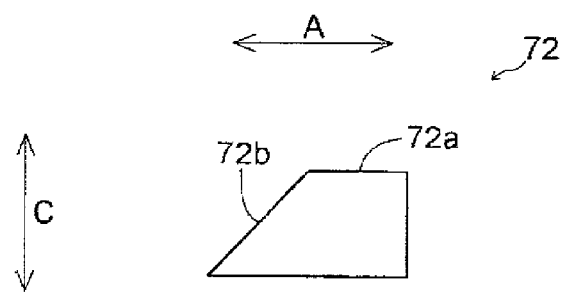
[FIG. 15] An enlarged cross-sectional view showing the structure of an upper reflector member of the retaining member shown in FIG. 11.

As shown in FIGS. 11 and 13, the upper reflector member 72 is formed to sandwich and retain the light guide bar 30 together with the lower reflector member 71. As shown in FIGS. 11 and 15, the upper reflector member 72 has a front surface (upper surface) 72a and an inner surface 72b. On the front surface (upper surface) 72a of the upper reflector member 72, the diffusion plate 41 and the optical sheet 42 are arranged. The inner surface 72b of the upper reflector member 72 is formed to be inclined, and thereby reflects light that is emitted from the light guide bars 30 and that reaches the upper reflector member 72, to the side of the diffusion plate 41 (the side of the liquid crystal display panel).

In the second embodiment, the retaining member 70 is attached to the attachment member 55 (see FIG. 13) of the frame 50 with the light guide bars 30 retained. In other words, in the second embodiment, the light guide bars 30 and the LED modules 20 are attached to the frame 50 (the attachment member 55) through the retaining member 70.

Figure 16:
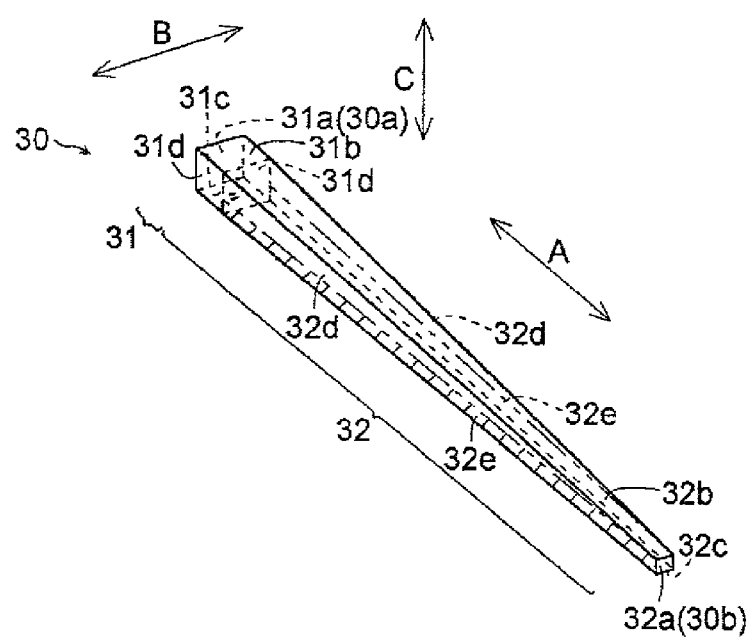
[FIG. 16] A perspective view showing the structure of the light guide bar of the backlight device according to the second embodiment of the present invention.

As shown in FIG. 16, the light guide bar 30 includes a retaining portion 31 on the side of the entrance end 30a. The retaining portion 31 is a part that is retained by the retaining member 70 (see FIG. 11), and is formed in the shape of, for example, a rectangular parallelepiped so as to fit into the concave portion 71a (see FIG. 11) of the retaining member 70. Specifically, as shown in FIGS. 16 and 17, the retaining portion 31 of the light guide bar 30 includes: the entrance end 30a (the entrance surface 31a) that the light emitted from the LED 22 (see FIG. 13) enters; a front surface (upper surface) 31b and a back surface (lower surface) 31c; and a pair of side surfaces 31d.

Figure 17:
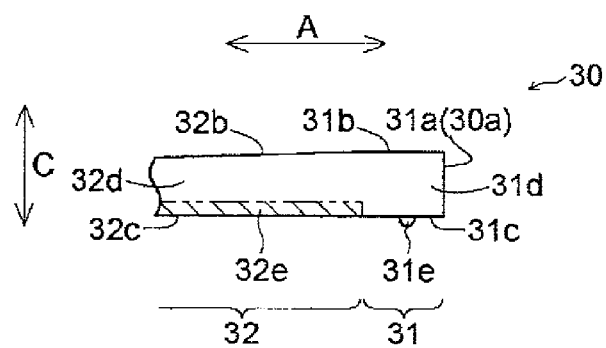
[FIG. 17] A side view showing the structure of the light guide bar of the backlight device according to the second embodiment of the present invention.
Figure 18:
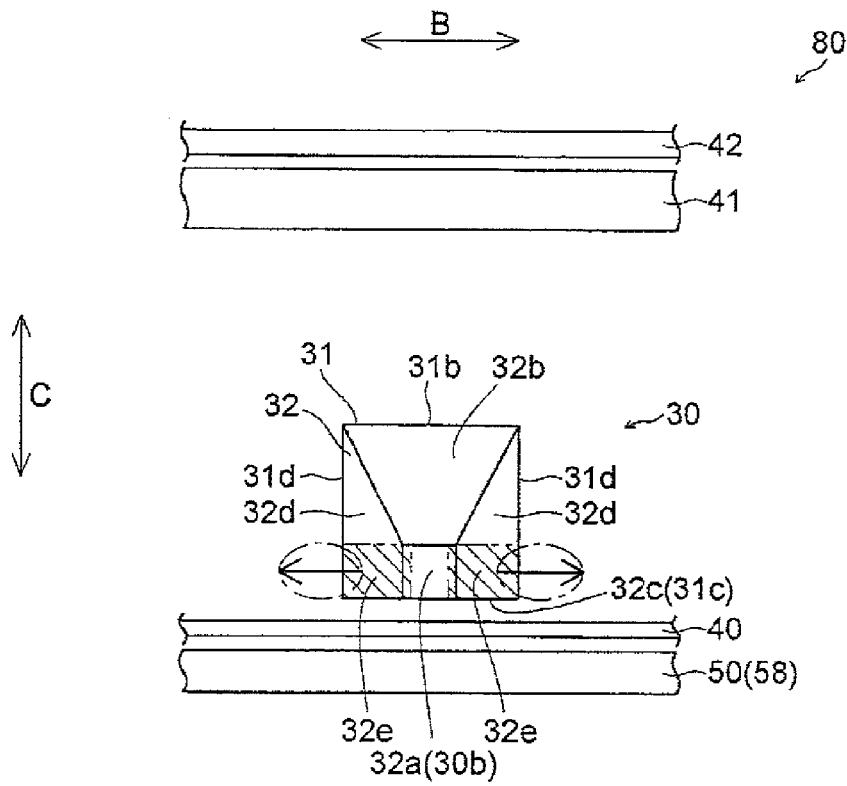
[FIG. 18] An enlarged front view for illustrating the structure of the light guide bar of the backlight device according to the second embodiment of the present invention.
Figure 19:
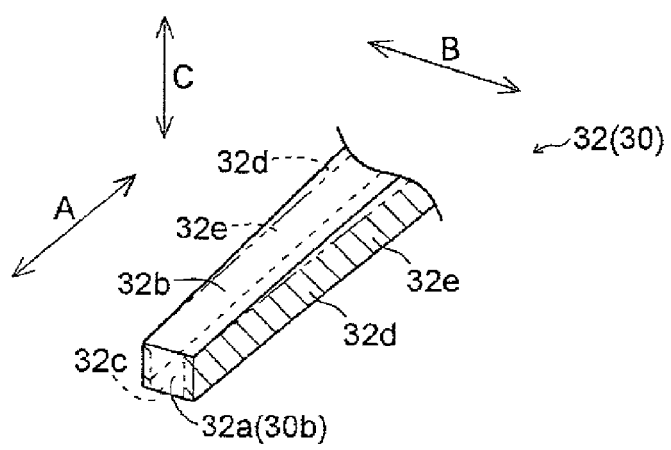
[FIG. 19] An enlarged perspective view showing the structure of the light guide bar of the backlight device according to the second embodiment of the present invention.

As shown in FIG. 17, the entrance surface 31a is formed perpendicularly to the A direction. The front surface 31b and the back surface 31c are formed parallel to each other, and are formed perpendicularly to the direction (C direction) of thickness of the backlight device 80. As shown in FIG. 18, the pair of side surfaces 31d are formed parallel to each other, and are formed perpendicularly to the B direction.

As shown in FIG. 17, on the back surface 31c, the convex portion 31e protruding downward is formed. The convex portion 31e is formed, for example, hemispherically so as to engage with the engagement concave portion 71b of the lower reflector member 71 (see FIGS. 12 and 13). However, the convex portion 31e may be shaped such that the convex portion 31e can engage with the engagement concave portion 71b. Hence, the shape of the convex portion 31e is not limited to the hemispherical shape, and the convex portion 31e may be formed in any other shape.

As shown in FIG. 16, as in the first embodiment, the light emission portion 32 of the light guide bar 30 is formed to be tapered (tapered shape).

Specifically, the light emission portion 32 includes: a top end surface 32a (the top end 30b) formed on the side opposite to the entrance surface 31a (30a) (the entrance end 30a) of the retaining portion 31; a front surface (upper surface) 32b (see FIG. 17); a back surface (lower surface) 32c (see FIG. 17); and a pair of side surfaces 32d (see FIGS. 17 and 18).

The top end surface 32a is formed perpendicularly to the A direction. The top end surface 32a is formed so as to have an area smaller than the entrance surface 31a of the retaining portion 31. Furthermore, as shown in FIG. 18, the height of the top end surface 32a (the length in the C direction) is smaller than half the height (the length in the C direction) of the entrance surface 31a (see FIG. 17) of the retaining portion 31.

As shown in FIGS. 17 and 18, the back surface 32c is formed perpendicularly to the C direction, and is formed in the same flat plane as the back surface 31c of the retaining portion 31. As shown in FIGS. 16 and 17, the front surface 32b is formed so as to be inclined with respect to the front surface 31b of the retaining portion 31. Hence, as the front surface 32b of the light emission portion 32 extends away from the entrance surface 31a, the distance between the front surface 32b and the back surface 32c is decreased.

As shown in FIG. 16, the pair of side surfaces 32d are formed so as to be inclined with respect to the side surfaces 31d of the retaining portion 31. Hence, as the pair of side surfaces 32d extend away from the entrance surface 31a, the distance between the pair of side surfaces 32d is decreased.

Figure 20:
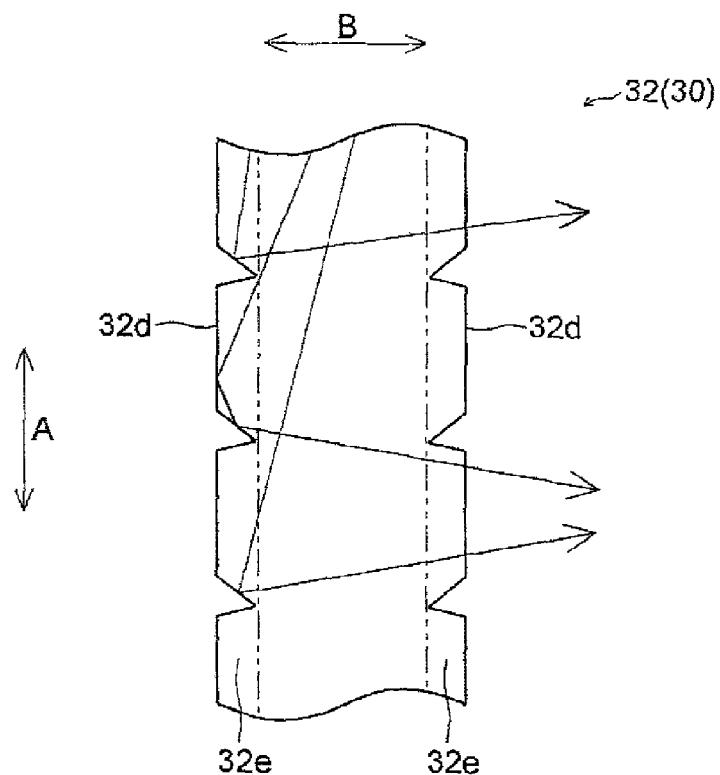
[FIG. 20] An enlarged view showing the structure of the light guide bar of the backlight device according to the second embodiment of the present invention.

In the second embodiment, as shown in FIGS. 16 to 19, in the pair of side surfaces 32d of the light emission portion 32, processing portions 32e for changing the direction of travel of the light from the LEDs 22 to the direction suitable for emission to the outside are formed. The processing portion 32e has the function of performing refraction or reflection such that the light which is guided while being totally reflected can be emitted to the outside without being totally reflected. Hence, for example, as shown in FIG. 20, the light that has reached the processing portion 32e on one side surface 32d is mainly emitted from a surface (the other side surface 32d) arranged opposite the one side surfaces 32d. The hatched regions in FIGS. 16 to 19 indicate the processing portions 32e.

In the second embodiment, as shown in FIGS. 16 and 17, the processing portion 32e is formed so as to extend along the longitudinal direction of the light guide bar 30. Furthermore, the processing portion 32e is formed in the shape of a band having substantially the same width as the height of the top end surface 32a (the length in the C direction). In other words, the processing portion 32e is formed in the shape of a band having substantially the same width as the length of one side of the top end surface 32a.

As shown in FIG. 20, the processing portions 32e are formed with, for example, a plurality of triangular prisms. However, the processing portions 32e may be formed with dot portions (not shown) formed by dot type printing processing using lens (not shown) and white ink (white paint) instead of the prisms.

When the processing portions 32e are formed with the prisms or the lens, the light from the LEDs 22 (see FIG. 11) is refracted or reflected off the processing portions 32e, and thus the direction of travel of the light is changed, with the result that total reflection conditions are not satisfied. In this way, the light entering the light guide bar 30 is emitted to the outside through the light emission portion 32. On the other hand, when the processing portions 32e are formed with the dot portions by the dot type printing processing, the light from the LEDs 22 (see FIG. 11) is reflected or diffused by the processing portions 32e, and thus the direction of travel of the light is changed, with the result that total reflection conditions are not satisfied. In this way, as described above, the light entering the light guide bar 30 is emitted to the outside through the light emission portion 32.

As shown in FIG. 18, the light that is to be emitted from the light guide bar 30 (the processing portion 32e) is emitted with a predetermined emission angle distribution produced in the C direction. Regions surrounded by alternate long and short dashed lines in FIG. 18 indicate the emission angle distribution of the light emitted from the light guide bar 30 in the C direction.

Here, in order to achieve the uniformity of the illumination light while reducing the thickness of the backlight device 80, the illumination light preferably reaches the diffusion plate 41 in a wide range.

Hence, in the second embodiment, the backlight device 80 is formed such that the length of an optical path in which the light emitted from the light guide bars 30 reaches the diffusion plate 41 is increased. Specifically, the processing portion 32e is formed in the lower side part of the side surface 32d of the light emission portion 32 (the part of the side surface 32d on the side opposite to the liquid crystal display panel) whereas the processing portion 32e is not formed in the upper side part of the side surface 32d (the part of the side surface 32d on the side of the liquid crystal display panel). The diffusion plate 41 (the light guide bars 30) is arranged such that the distance from the light guide bar 30 (the front surface 31b) to the diffusion plate 41 is longer than the distance from the light guide bar 30 (the back surface 31c) to the reflective sheet 40.

The other configurations in the second embodiment are the same as in the first embodiment.

In the second embodiment, as described above, the retaining member 70 that retains the part (the retaining portion 31) of the light guide bar 30 on the side of the entrance end is provided, and thus it is possible to easily attach a plurality of light guide bars 30 to the frame 50 (the attachment member 55).

In the second embodiment, the convex portion 31e is provided on the light guide bar 30, and the engagement concave portion 71b that engages with the convex portion 31e of the light guide bar 30 is provided in the retaining member 70, and thus it is possible to locate the light guide bar 30 in the predetermined position of the retaining member 70. Hence, regardless of deformation caused by attachment tolerances, thermal expansion or the like, it is possible to appropriately maintain the distance between the light guide bars 30 and the LEDs 22. Thus, since it is possible to reduce the movement of the light guide bars 30 to the side of the LEDs 22, it is possible to more reduce the contact of the light guide bars 30 with the LEDs 22. Since it is also possible to reduce the movement of the light guide bars 30 to the side opposite to the LEDs 22, it is possible to reduce the increase in the distance between the LEDs 22 and the light guide bars 30. In this way, it is possible to reduce the decrease in the efficiency of the entrance of the light emitted from the LEDs 22 to the light guide bars 30. It is also possible to enhance the workability of the assembly of the backlight device 80.

In the second embodiment, the processing portions 32e are formed in the light guide bars 30, and thus it is possible to easily emit the light from the light emission portions 32 of the light guide bars 30. The processing portion 32e is provided in the lower side part of the side surface 32d of the light guide bar 30 whereas the processing portion 32e is not provided in the upper side part of the side surface 32d of the light guide bar 30, with the result that it is possible to emit light from the lower side part of the side surface 32d of the light guide bar 30. Thus, it is possible to increase the length of the optical path in which the light emitted from the light guide bar 30 reaches the diffusion plate 41. In this way, since the light emitted from the light guide bars 30 can be made to reach the wide range of the diffusion plate 41, it is possible to more enhance the uniformity of the illumination light.

Figure 21:
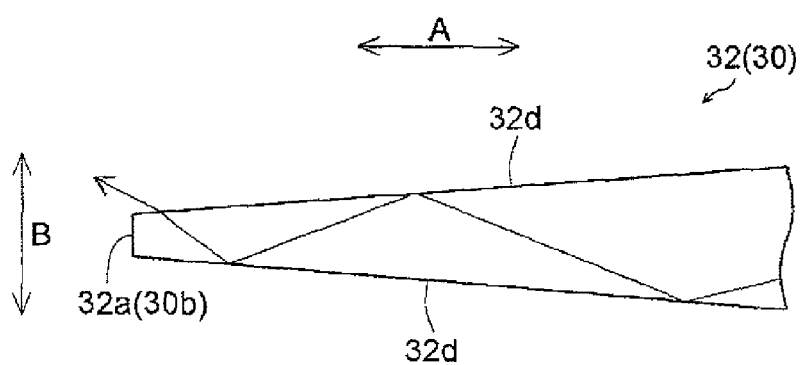
[FIG. 21] A plan view showing the structure of the light guide bar of the backlight device according to the second embodiment of the present invention.

In the second embodiment, since as described above, the light emission portion 32 (the light guide bar 30) is formed to be tapered (tapered shape), as shown in FIG. 21, the probability that the light from the LEDs 22 (see FIG. 11) reaches the processing portions 32e (see FIG. 20) of the light emission portion 32 is increased, and the probability that the light reaches the top end surface 32a is decreased.

The other effects in the second embodiment are the same as in the first embodiment.

(Third Embodiment)

Figure 22:
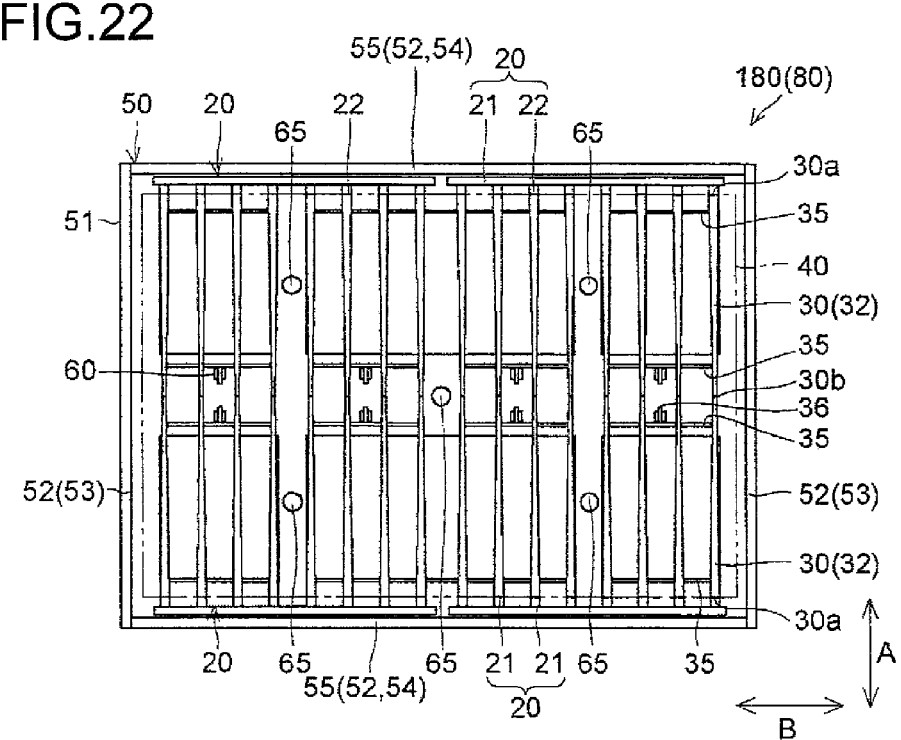
[FIG. 22] A plan view of a backlight device according to a third embodiment of the present invention.
Figure 23:
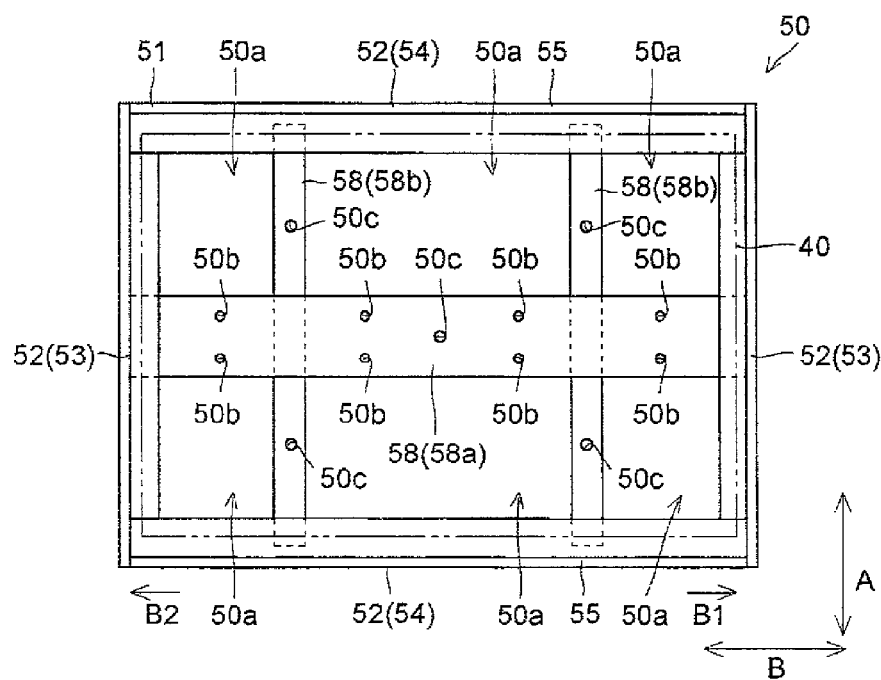
[FIG. 23] A plan view of the frame of the backlight device according to the third embodiment of the present invention.
Figure 24:
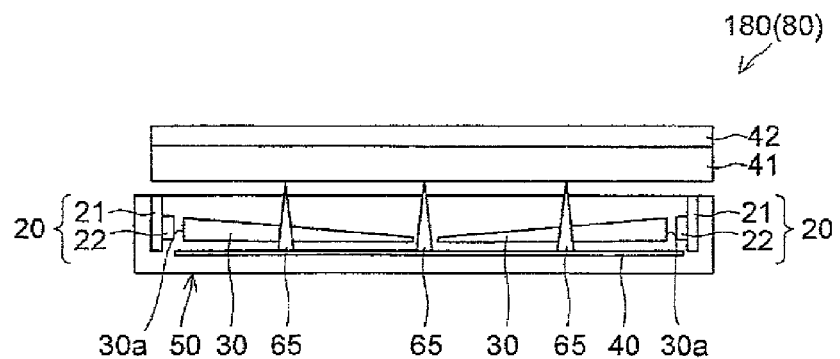
[FIG. 24] A cross-sectional view schematically showing the backlight device according to the third embodiment of the present invention.

FIG. 22 is a plan view of a backlight device according to a third embodiment of the present invention. FIG. 23 is a plan view of the frame of the backlight device according to the third embodiment of the present invention. FIG. 24 is a cross-sectional view schematically showing the backlight device according to the third embodiment of the present invention. With reference to FIGS. 22 to 24, the backlight device according to the third embodiment of the present invention will now be described. In the individual drawings, the corresponding constituent elements are identified with the same symbols, and thus their description will not be repeated as necessary. For ease of understanding, the reflective sheet 40 is omitted in FIG. 22.

In the third embodiment, as shown in FIG. 22, the LED modules 20 are arranged on a plurality of sides of a backlight device 180 (80). Specifically, a plurality of LEDs 22 (the LED modules 20) are arranged in two rows along the longitudinal direction (the B direction) on both sides in the widthwise direction (the A direction) of the backlight device 180 (the frame 50). In other words, the LEDs 22 (the LED modules 20) are arranged on the two sides (the long sides) of the backlight device 180 (80) opposite each other.

In the third embodiment, a plurality of light guide bars 30 are arranged in the illumination region of the backlight device 180 so as to extend in the widthwise direction (the A direction) of the backlight device 180. The light guide bars 30 are divided into two collection groups, the upper side (the side in A1 direction) and the lower side (the side in A2 direction) in the widthwise direction (the A direction) of the backlight device 180. The light guide bars 30 belonging to each of the collection groups are aligned apart from each other (a predetermined distance apart) in the longitudinal direction (the B direction) of the backlight device 180. The entrance end 30a of each light guide bar 30 is arranged on the side of the LED 22, and the top end 30b is located in a region (the region away from the LED 22) opposite to the LED 22.

The frame 50 of the backlight device 180 includes, as shown in FIG. 23, the outer frame 51 and the coupling part 58. The outer frame 51 of the frame 50 includes the two short side members 53 and the two long side members 54. In the third embodiment, each of the two long side members 54 forms the attachment member 55 to which the LED modules 20 and the light guide bars 30 are attached.

The coupling part 58 of the frame 50 is formed with a first coupling part 58a and a second coupling part 58b. The first coupling part 58a is formed with a plate-shaped member having a relatively wide width, and couples the short side members 53 of the outer frame 51. The first coupling part 58a is coupled substantially to the center parts of the frame 50 in the widthwise direction (the A direction) so as to extend substantially parallel to the direction of the entire length of the long side members 54 (the B direction). In the first coupling part 58a, the through holes 50b and 50c are formed. As shown in FIGS. 22 and 23, the clips 60 (see FIG. 22) retaining the light guide bars 30 are attached to the through holes 50b (see FIG. 23). The support pins 65 (see FIGS. 22 and 24) supporting the diffusion plate 41 (see FIG. 24) are attached to the through holes 50c (see FIG. 23).

The second coupling part 58b is formed with a plate-shaped member having a width narrower than the first coupling part 58a, and couples the long side members 54 of the outer frame 51. In the third embodiment, for example, two second coupling parts 58b are provided. These two second coupling parts 58b are connected to predetermined positions (for example, positions on the right side (the side of B1) and the left side (the side of B2) with respect to the center of the frame 50 in the longitudinal direction (the B direction)) of the long side members 54 so as to extent substantially parallel to the direction of the entire length of the short side members 53 (the A direction). In the second coupling part 58b, the through holes 50c are formed; the support pins 65 (see FIGS. 22 and 24) are attached to the through holes 50c.

As described above, the coupling part 58 of the frame 50 is attached so as to enhance the strength of the frame 50 and to correspond to the positions where the clips 60 retaining the light guide bars 30 and the support pins 65 supporting the diffusion plate 41 are arranged.

As shown in FIG. 24, the diffusion plate 41 and the optical sheet 42 are arranged on the outer frame 51 (see FIG. 23) of the frame 50 and the support pins 65.

The other configurations in the third embodiment are the same as in the first embodiment.

The effects of the third embodiment are the same as those of the first embodiment.

In the third embodiment, since the LEDs 22, which are heat sources, are dispersed and arranged, heat generated by the LEDs 22 can be easily dissipated. Since it is possible to reduce the increase in the temperature of the LEDs 22 and parts around the LEDs 22, it is possible to reduce the decrease in the reliability of the LEDs 22 and the other circuit components.

(Fourth Embodiment)

Figure 25:
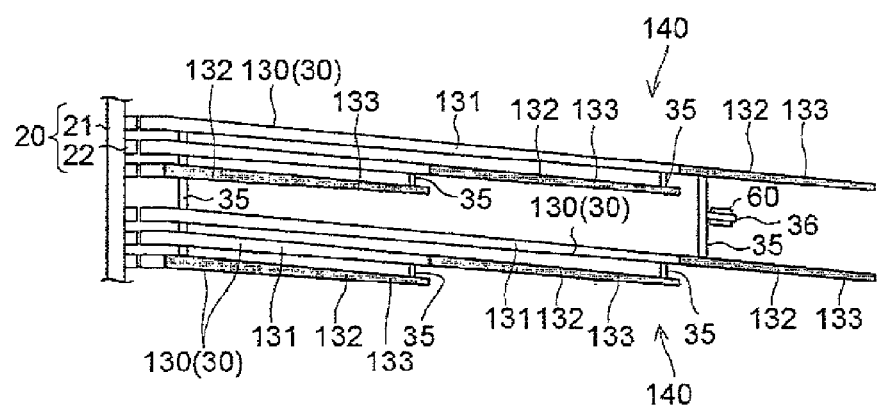
[FIG. 25] A plan view showing the light guide bars of the backlight device according to a fourth embodiment of the present invention.
Figure 26:
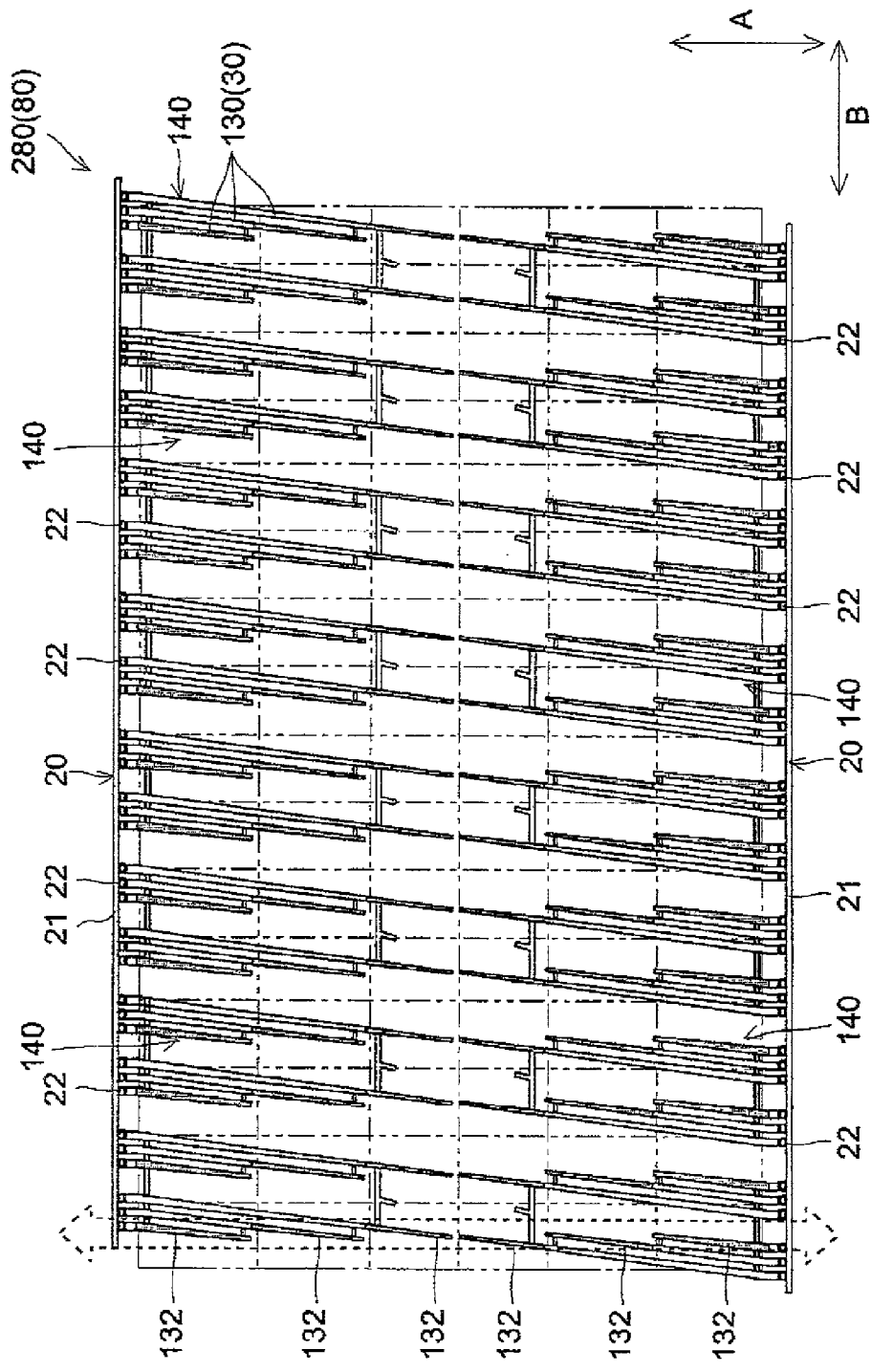
[FIG. 26] A plan view showing the light guide bars of the backlight device according to the fourth embodiment of the present invention.
Figure 27:
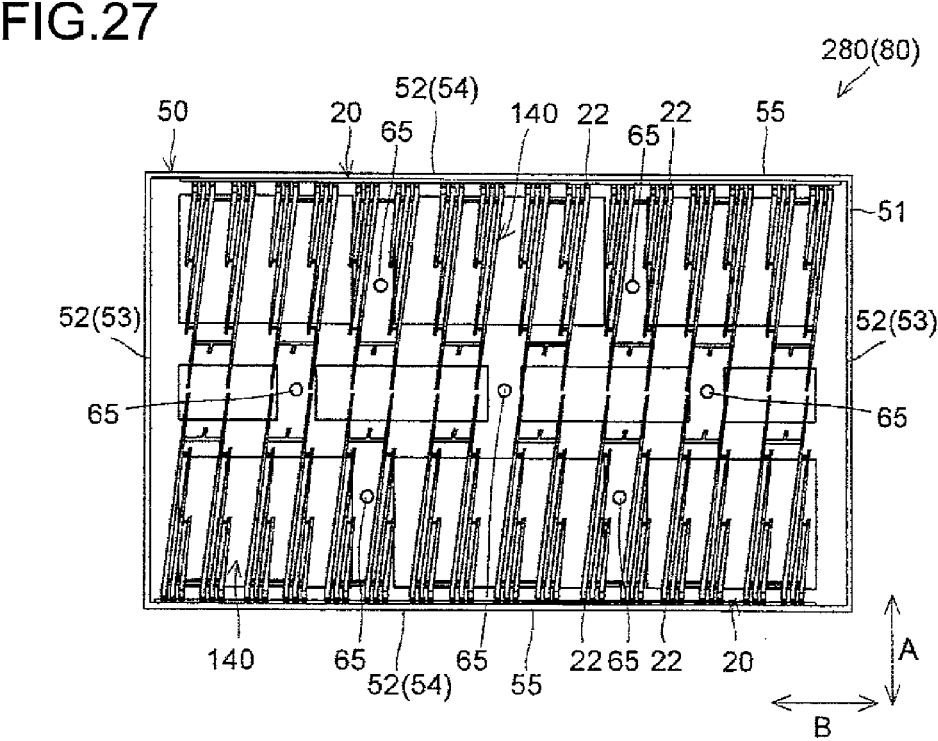
[FIG. 27] A plan view of the backlight device according to the fourth embodiment of the present invention.
Figure 28:
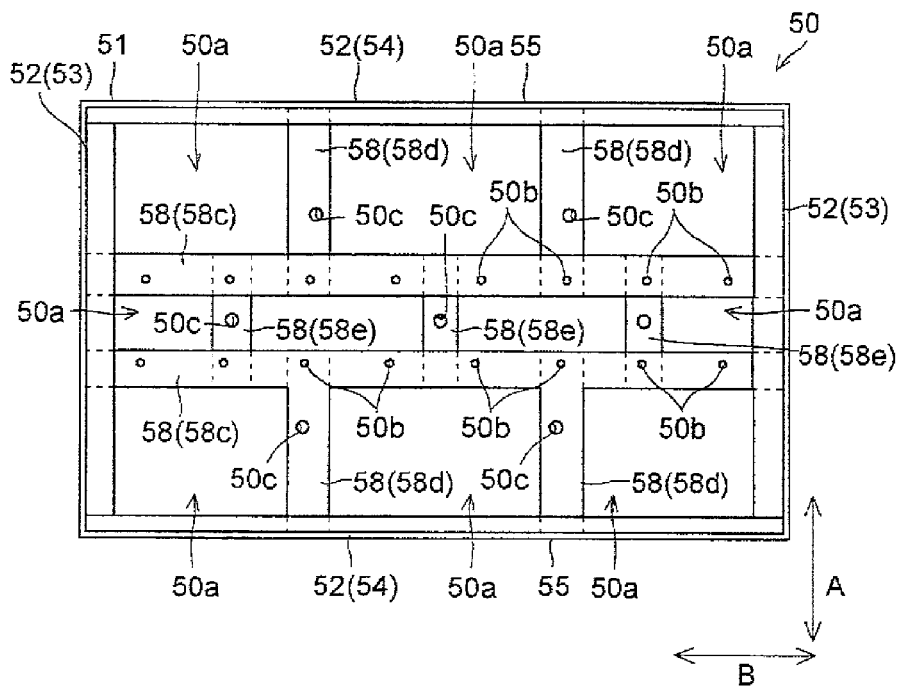
[FIG. 28] A plan view of the frame of the backlight device according to the fourth embodiment of the present invention.
Figure 29:
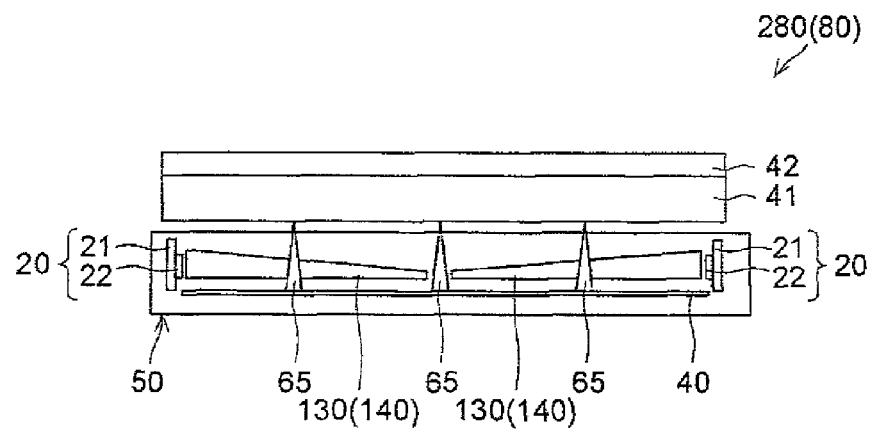
[FIG. 29] A cross-sectional view schematically showing the backlight device according to the fourth embodiment of the present invention.

FIGS. 25 and 26 are plan views showing the light guide bars of a backlight device according to a fourth embodiment of the present invention. FIG. 27 is a plan view of the backlight device according to the fourth embodiment of the present invention. FIG. 28 is a plan view of the frame of the backlight device according to the fourth embodiment of the present invention. FIG. 29 is a cross-sectional view schematically showing the backlight device according to the fourth embodiment of the present invention. With reference to FIGS. 25 to 29, the backlight device according to the fourth embodiment of the present invention will now be described. In the individual drawings, the corresponding constituent elements are identified with the same symbols, and thus their description will not be repeated as necessary. For ease of understanding, the reflective sheet is omitted in FIG. 27.

In the fourth embodiment, as shown in FIG. 25, m (m is an integer of two or more; for example, three) light guide bars 130 (30) of different lengths are used. The m light guide bars 130 of different lengths form a light guide bar group 140. Each of the light guide bars 130 of the light guide bar group 140 includes a light propagation portion 131 that propagates the light from the LEDs 22 while totally reflecting it and a light emission portion 132 that emits the light propagate by the light propagation portion 131 to the outside. The hatched regions in FIGS. 25 and 26 indicate the light emission portions 132.

The light propagation portions 131 of the light guide bars 130 included in one light guide bar group 140 have different lengths. On the other hand, the light emission portions 132 of the light guide bars 130 included in one light guide bar group 140 have the same length as each other. The light emission portion 132 is arranged on the side of the top end of the light guide bar 130. The light guide bars 130 of the light guide bar group 140 are arranged such that the light emission portions 132 are connected linearly.

As shown in FIGS. 26 and 27, in the fourth embodiment, as in the third embodiment, the LEDs 22 (the LED modules 20) are arranged on the two sides (the long sides) of a backlight device 280 (80) opposite each other. The LED modules 20 are configured such that they can adjust the strength of light for each of the LEDs 22. A plurality of light guide bar groups 140 are aligned along the longitudinal direction (the A direction) of the backlight device 280.

The light guide bars 130 are arranged such that the light emission portion 132 is located in each of the regions (regions surrounded by two-dot chain lines of FIG. 26) obtained by dividing the illumination region (the display region of the liquid crystal display panel) of the backlight device 280 into the A direction and the B direction.

In the fourth embodiment, each of the light guide bars 130 extends in a direction inclined with respect to the direction in which the LEDs 22 are aligned (the longitudinal direction (the B direction) of the backlight device 280). Hence, the light emission portions 132 are arranged substantially linearly in the direction (the B direction) perpendicular to the direction (the A direction) in which the LEDs 22 are aligned. The light guide bar groups 140 are arranged symmetrically with respect to the center of the backlight device 280.

As shown in FIG. 25, in the light emission portion 132 of the light guide bar 130, a processing portion 133 for changing the direction of travel of the light propagated by the light propagation portion 131 (see FIG. 25) to a direction suitable for emission to the outside is formed. In other words, the processing portion 133 has the function of refracting or reflecting the light propagated through the light propagation portion 131 while being totally reflected such that the light can be emitted to the outside without being totally reflected. The processing portion 133 is formed with, for example, a plurality of triangular prisms. The processing portion 133 is formed, for example, in the bottom surface of the light guide bar 130. The processing portion 133 may be formed with, instead of the prisms, dot portions formed by dot type printing processing using lens and white ink.

As shown in FIGS. 27 and 28, the frame 50 of the backlight device 280 includes the outer frame 51 and the coupling parts 58. The coupling parts 58 of the frame 50 are attached so as to enhance the strength of the frame 50 and to correspond to the positions where the clips 60 (see FIG. 25) retaining the light guide bars 130 and the support pins 65 supporting the diffusion plate 41 are arranged. For example, as shown in FIG. 28, the coupling parts 58 include a plurality of types of coupling parts 58c to 58e of different shapes. The coupling parts 58c couple the short side members 53 of the outer frame 51. The coupling parts 58d couple the long side members 54 of the outer frame 51 to the coupling parts 58c. The coupling parts 58e couple the coupling parts 58c together.

In the coupling parts 58 of the frame 50, the through holes 50b and 50c are formed. The clips 60 (see FIG. 25) and the support pins 65 (see FIG. 29) are attached to these through holes 50b and 50c. As shown in FIG. 29, the diffusion plate 41 and the optical sheet 42 are arranged on the outer frame 51 (see FIG. 28) of the frame 50 and the support pins 65.

In the backlight device 280 configured as described above and according to the fourth embodiment, the light that has entered the light guide bar 130 from the LED 22 is propagated through the light propagation portion 131 and is emitted from the light emission portion 132 on the side of the top end. Here, when the specific LED 22 of the LED module 20 is turned on, light is applied from the light emission portion 132 of the corresponding light guide bar 130. Since as shown in FIG. 26, the light emission portions 132 of the light guide bars 130 are arranged in each of the regions obtained by dividing the illumination region (the display region of the liquid crystal display panel) of the backlight device 280 into the A direction and the B direction, it is possible to independently control the illumination light in each of the regions. In other words, it is possible to perform region-by-region light control (local control on the amount of light) such as local dimming control.

Hence, in the fourth embodiment, the light from the light emission portion 132 of each of the light guide bars 130 is independently controlled, and thus it is possible to control, according to the image, the strength of illumination of each of the regions within the illumination region, with the result that it is possible to increase the contrast of the display image and reduce power consumption. By controlling the strength of illumination of each region in synchronization with the scanning of the liquid crystal display panel, it is also possible to enhance the function of displaying moving images.

When all the LEDs 22 are turned on, the light from the LEDs 22 is converted by the light guide bar group 140 into linear application light. In the fourth embodiment, since the light emission portions 132 are arranged substantially linearly in the direction (the B direction) perpendicular to the direction (the A direction) in which the LEDs 22 are aligned, the linear application light rays (see broken-line arrows) converted by the light guide bars 130 (the light guide bar group 140) are aligned to coincide with the vertical direction (the A direction) of the illumination region within the illumination region. Hence, the viewability of the display image is enhanced.

The other effects in the fourth embodiments are the same as in the first and third embodiments.

It should be considered that the embodiments disclosed here are illustrative in all respects and not restrictive. The scope of the present invention is indicated not by the description of the above embodiments but by the scope of claims, and further includes meanings equivalent to the scope of claims and all modifications within the scope.

For example, although in the first to fourth embodiments, the examples where the display device and the display panel of the present invention are applied to the liquid crystal display device and the liquid crystal display panel have been described, the present invention is not limited to these examples, and may be applied to a display panel and a display device other than the liquid crystal display panel and the liquid crystal display device.

Although in the first to fourth embodiments, the examples where the LED modules are arranged on one or both of the long sides (the long side member of the frame) of the backlight device have been described, the LED modules are preferably arranged on at lease one side (at least one side of the frame) of the backlight device (the illumination region). Hence, for example, the LED modules can be arranged on one or both of the short sides (the short side member of the frame) of the backlight device.

Although in the first to fourth embodiments, the examples where a plurality of light guide bars are coupled by the coupling portions have been described, the present invention is not limited to these examples, and a configuration in which a plurality of light guide bars are not coupled by the coupling portions may be adopted. When a plurality of light guide bars are coupled by the coupling portions, one coupling portion may be provided between adjacent light guide bars or a plurality of coupling portions may be provided therebetween. The number of light guide bars coupled by the coupling parts can be changed as necessary.

Although in the first to fourth embodiments, the examples where the light guide bars and the coupling portions are integrally molded have been described, the present invention is not limited to these examples, and the light guide bars and the coupling portions may not be integrally molded.

Figure 30:
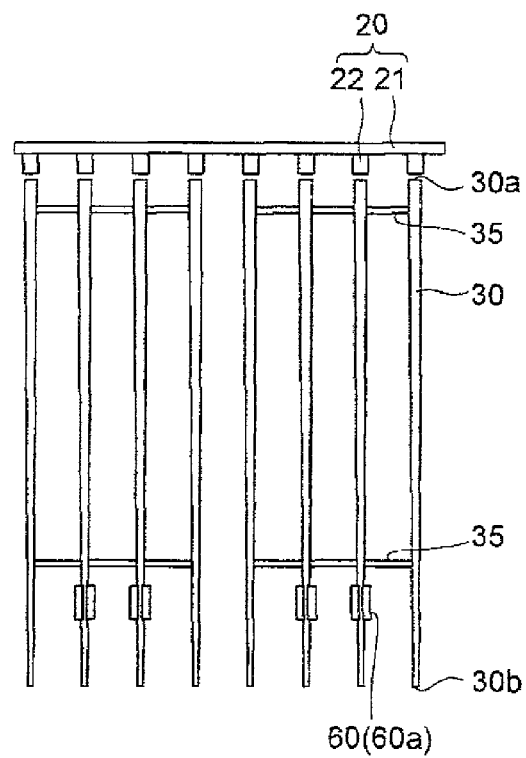
[FIG. 30] A plan view showing the light guide bars of a backlight device according to a variation of the present invention.
Figure 31:
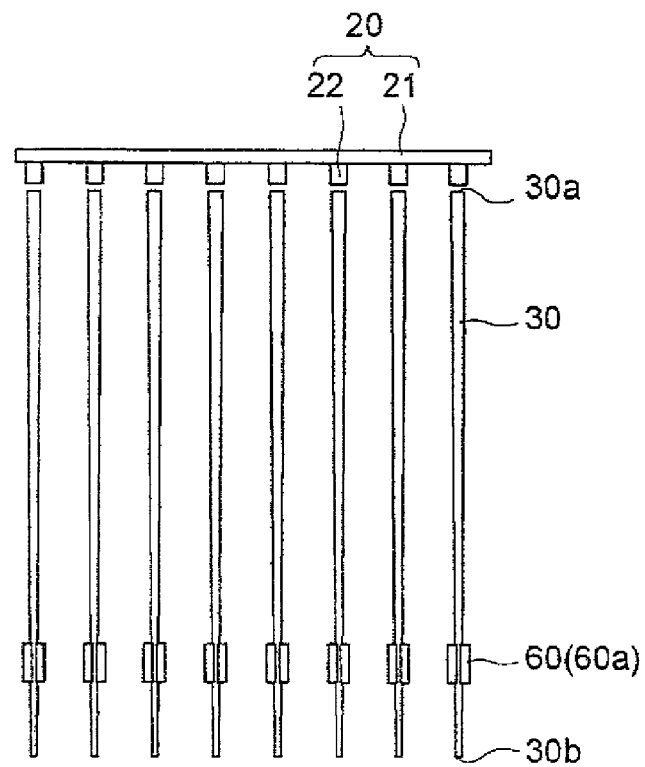
[FIG. 31] A plan view showing the light guide bars of a backlight device according to other variation of the present invention.

Although in the first to fourth embodiments, the examples where the protrusion portion is provided on the coupling portion coupling the light guide bars, and the protrusion portion is retained (sandwiched) by the clip have been described, the present invention is not limited to these examples, and the light guide bar may be directly retained (sandwiched) by the clip. For example, as shown in FIG. 30, the protrusion portion may not be provided on the coupling portion 35, and the light guide bars 30 coupled by the coupling portion 35 may be retained (sandwiched) by the clips. For example, as shown in FIG. 31, the light guide bars 30 may not be coupled, and each of the light guide bars 30 may be retained (sandwiched) by the clip.

Although in the first to fourth embodiments, the examples where the light guide bar is formed to be tapered have been described, the present invention is not limited to these examples, and the light guide bar may be formed, for example, in the shape of a rectangular parallelepiped whose cross-sectional area is uniform. However, since the light guide bar is formed to be tapered, and thus it is possible to easily emit light from the light emission portion, the light guide bar is preferably formed to be tapered.

Although in the first to fourth embodiments, the examples where the backlight device includes, as the optical members (optical sheets), the diffusion plate, the prism sheet, the lens sheet and the like have been described, the present invention is not limited to these examples, and the optical members (optical sheets) can be changed (addition, deletion) as necessary. The clip that retains the light guide bar and the support pin that supports the diffusion plate or the like can be used as necessary. Hence, a configuration where the clip or the support pin is not used may be adopted.

Although in the first to fourth embodiments, the examples where the bar-shaped member obtained by processing the metal plate is used to form the frame-shaped frame have been described, the bar-shaped member that forms the frame may be a member other than the member obtained by processing the metal plate. For example, the bar-shaped member may be an extruded product or the like.

Figure 32:
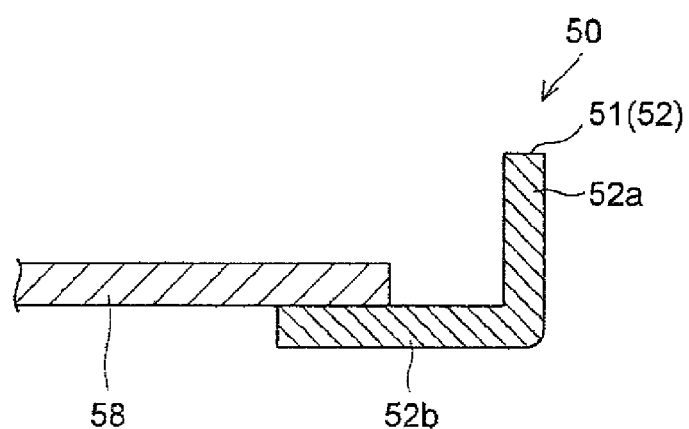
[FIG. 32] A cross-sectional view showing part of the frame of the backlight device according to another variation of the present invention.
Figure 33:
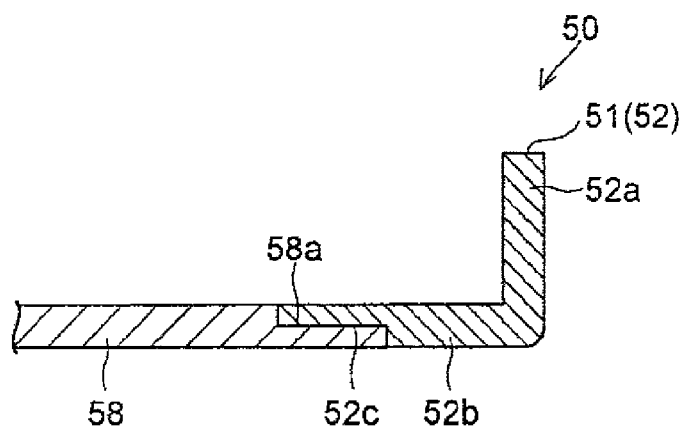
[FIG. 33] A cross-sectional view showing part of the frame of the backlight device according to another variation of the present invention.
Figure 34:
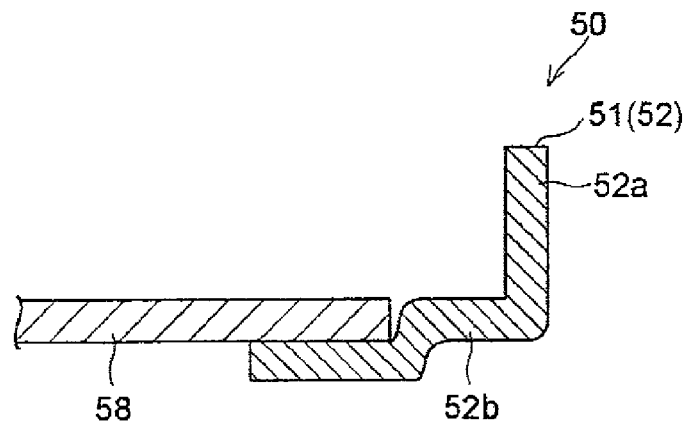
[FIG. 34] A cross-sectional view showing part of the frame of the backlight device according to another variation of the present invention.

In the embodiments described above, the arrangement (layout) of the coupling parts in the frame can be changed as necessary. When the bar-shaped member and the coupling part are coupled, for example, as shown in FIG. 32, they may be coupled such that the coupling part 58 is located on the upper side of the bottom portion 52b of the bar-shaped member 52. For example, as shown in FIG. 33, a step 52c is formed in a part (for example, a part in which to overlap the coupling part 58) of the bottom portion 52b of the bar-shaped member 52, and a step 58a that engages with the step 52c is formed in the coupling part 58, with the result that the upper surface of the bottom portion 52b of the bar-shaped member 52 may be formed to be substantially the same as the upper surface of the coupling part 58. Furthermore, for example, as shown in FIG. 34, a part (for example, a part in which to overlap the coupling part 58) of the bottom portion 52b of the bar-shaped member 52 is processed to form a step, with the result that the upper surface of the bottom portion 52b of the bar-shaped member 52 may be formed to be substantially the same as the upper surface of the coupling part 58. Preferably, even in the coupling parts and the bar-shaped members, for example, a step is prevented from being formed in a region where the reflective sheet or the light guide bar is arranged.

Although in the first to fourth embodiments, the examples where the wall portion is formed in each of the bar-shaped members of the outer frame have been described, the present invention is not limited to these examples, and a configuration in which the wall portion is not formed in part of the outer frame can be adopted. In this case, preferably, the wall portion is not formed in the attachment member to which the LED modules and the light guide bars are attached.

Although in the first to fourth embodiments, the examples where the coupling parts are connected (coupled) to the outer frame of the frame have been described, a configuration in which the coupling parts are not connected (coupled) to the frame can be adopted. Furthermore, it is possible to adopt a configuration in which the attachment member is used without formation of the frame, and only the attachment member is provided. The retaining member described in the second embodiment can be the attachment member.

In the embodiments described above, the light guide bars and the LED modules may be attached to the frame through the retaining member described in the second embodiment or may be attached to the frame through a member other than the retaining member described above. The light guide bars and the LED modules may be directly attached to the frame.

In the embodiments described above, the number of light guide bars can be changed as necessary.

In the embodiments described above, the type of LED is not particularly limited. For example, as the LED, a LED can be used that includes a LED chip (light emitting chip) which emits blue light and a fluorescent member which receives the light from the LED chip to emit yellow fluorescent light. The LED described above generates white light with the light from the blue light emitting LED chip and the fluorescent light. The number of LED chips included in the LED is not particularly limited.

The fluorescent member incorporated in the LED is not limited to the fluorescent member that emits yellow fluorescent light. For example, as the LED, a LED can be used that includes a LED chip which emits blue light and a fluorescent member which receives the light from the LED chip to emit green fluorescent light and red fluorescent light, and that generates white light with the blue light from the LED chip and the fluorescent light (the green light and the red light).

The LED chip incorporated in the LED is not limited to the LED chip that emits blue light. For example, the LED may include a red LED chip which emits red light, a blue LED chip which emits blue light and a fluorescent member which receives the light from the blue LED chip to emit green fluorescent light. The LED described above can generate white light with the red light from the red LED chip, the blue light from the blue LED chip and the green fluorescent light.

Furthermore, the LED may be a LED that includes no fluorescent member. For example, the LED may include a red LED chip which emits red light, a green LED chip which emits green light and a blue LED chip which emits blue light, and mix the light from all the LED chips to generate white light.

Although in the first and third embodiments, the configurations where the processing portion is not formed in the light emission portion of the light guide bar have been described, as described in the second embodiment, the processing portion can be formed in the light emission portion of the light guide bar. As in the second embodiment, the processing portion may be formed in the side surface of the light emission portion, or may be formed in a part (for example, the back surface or the upper surface) other than the side surface. In the second embodiment, the processing portion may be formed in a part (for example, the back surface or the upper surface) other than the side surface.

Although in the second embodiment, the example where the light guide bars and the LED modules are attached to the frame (the attachment member) through the retaining member has been described, the present invention is not limited to the example, and, for example, the light guide bars may be attached to the frame (the attachment member) through the retaining member and the LED modules may be directly attached to the frame (the attachment member). The retaining member and the LED modules can be attached to the frame with, for example, screws or an adhesive. When the light guide bars are directly attached to the frame (the attachment member), the attachment can be performed with, for example, screws or an adhesive. When the light guide bars are attached to the frame (the attachment member) with screws, an attachment portion (for example, a portion like the coupling portion) can be provided in the vicinity of the entrance end of the light guide bar, and the light guide bars can be screwed in the attachment portion.

Although in the fourth embodiment, the example where the light guide bar group is formed with the three light guide bars of different entire lengths has been described, the present invention is not limited to the example, and the number of light guide bars of the light guide bar group can be changed as necessary.

Although in the fourth embodiment, a plurality of light guide bars of the light guide bar group have different entire lengths, the present invention is not limited to this configuration, and the light guide bar group may include the light guide bars of the same entire length. When the light guide bars of at least two types of entire lengths are included, in the light guide bar group, it is possible to prevent light rays from being aligned (gathered) along the direction in which the entrance ends are aligned.

However, when there are a large number of types of light guide bars of different entire lengths included in the light guide bar group, for example, the entrance ends of the light guide bars are aligned in a row, and thus it is possible to scatter the positions (the positions of the light emission portions (the processing portions)) through which light is emitted from the light guide bar to the outside without being aligned along the direction in which the entrance ends are aligned. Hence, preferably, as described in the fourth embodiment, a plurality of light guide bars are formed to have different entire lengths, and thus it is possible to easily guide the light in a direction intersecting the direction in which the entrance ends are aligned. Since it is possible to appropriately change the length of the light guide bar, it is also possible to easily change the distribution of the amount of light in the liquid crystal display panel.

Furthermore, although in the fourth embodiment, the example where the processing portion for changing the optical path of the light propagated therewithin is formed in the bottom surface of the light guide bar has been described, the present invention is not limited to the example, and the processing portion is preferably formed in at least one of the side surfaces of the light guide bar. The side surfaces of the light guide bar include the upper surface (top surface) and the bottom surface.

Although in the fourth embodiment, the example where a plurality of light guide bar groups are arranged symmetrically with respect to the center of the backlight device has been described, the present invention is not limited to the example, and, for example, a plurality of light guide bar groups may be arranged symmetrically with respect to a line.

Embodiments obtained by combining, as necessary, the technologies disclosed above are also included in the technical scope of the present invention.

INDUSTRIAL APPLICABILITY

The present invention can be utilized for illumination devices and display devices.

LIST OF REFERENCE SYMBOLS 10 liquid crystal display panel (display panel)
20 LED modules
22 LED (light source)
30, 130 light guide bar
30a, 31a entrance end, entrance surface
30b, 32a top end, top end surface
31 retaining portion
31e convex portion
32 light emission portion
35 coupling portion
36 protrusion portion
40 reflective sheet (reflective member)
40a, 40b through hole
41 diffusion plate
42 optical sheet
50 frame
50a hole formation space
50b, 50c through hole
51 outer frame
52 bar-shaped member
52a wall portion
52b bottom portion
53 short side member
54 long side member
55 attachment member
58, 58a to 58e coupling part
60 clip
65 support pin
70 retaining member
71 lower reflector member
71a concave portion
71b engagement concave portion
72 upper reflector member
80, 180, 280 backlight device (illumination device)
100 liquid crystal display device (display device)

The invention claimed is:
1. An illumination device comprising:
a frame including an outer frame, a first coupler coupled to the outer frame, and a hole formation space surrounded by the outer frame and the first coupler;
a plurality of light sources;

a plurality of light guide bars which include entrance ends that light from the light sources enters and which guide the light from the light sources;

a second coupler configured to couple at least two of the plurality of light guide bars to each other;

a clip configured to retain the at least two of the plurality of light guide bars coupled by the second coupler and fix the at least two of the plurality of light guide bars coupled by the second coupler to the frame; and a bar-shaped attachment member to which the light sources and the light guide bars are attached.

2. The illumination device of claim 1, wherein:

the frame is a frame-shaped frame which is assembled with a plurality of members; and the frame includes, as a part thereof, the bar-shaped attachment member.

3. The illumination device of claim 1, wherein the hole formation space has an area equal to or more than half a region surrounded by the outer frame.

4. The illumination device of claim 1, wherein the clip retains the light guide bar such that the light guide bar can be moved in a longitudinal direction of the light guide bar.

5. The illumination device of claim 1, the second coupler includes a protrusion portion which extends parallel to a longitudinal direction of the light guide bar; and the protrusion portion is retained by the clip.

6. The illumination device of claim 1, further comprising:

a diffusion plate which is arranged above the light guide bars; and a support pin which is fixed to a first coupler of the frame and which supports the diffusion plate.

7. The illumination device of claim 1, wherein a reflective member which reflects light from the light guide bars upwardly is arranged below the light guide bars.

8. The illumination device of claim 1, wherein the light guide bar is formed to be tapered.

9. The illumination device of claim 1, further comprising:

a retaining member which retains a part of the light guide bar on a side of the entrance end, wherein the light guide bar is attached to the attachment member through the retaining member.

10. The illumination device of claim 9, wherein a convex portion is provided on the light guide bar, and in the retaining member, a concave portion is provided which is fitted to the convex portion of the light guide bar.

11. The illumination device of claim 1, wherein the light guide bar is formed of a transparent resin.

12. A display device comprising:

an illumination device of claim 1; and a display panel which is illuminated by the illumination device.

* * * * *